(12) United States Patent
Ha et al.

(10) Patent No.: US 10,672,333 B2
(45) Date of Patent: Jun. 2, 2020

(54) WEARABLE ELECTRONIC DEVICE

(71) Applicant: Samsung Electronics Co., Ltd., Gyeonggi-do (KR)

(72) Inventors: Young-Hee Ha, Gyeonggi-do (KR); Dong-Hui Kim, Gyeonggi-do (KR); Jeong-Hun Kim, Gyeonggi-do (KR); Chi-Hyun Cho, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/126,008

(22) Filed: Sep. 10, 2018

(65) Prior Publication Data

US 2019/0012962 A1 Jan. 10, 2019

Related U.S. Application Data

(63) Continuation of application No. 14/841,876, filed on Sep. 1, 2015, now Pat. No. 10,074,303.

(30) Foreign Application Priority Data

Sep. 1, 2014 (KR) ........................ 10-2014-0115739

(51) Int. Cl.
*G09G 3/3225* (2016.01)
*G09G 3/20* (2006.01)
*G02B 27/01* (2006.01)
*G06F 3/0346* (2013.01)

(52) U.S. Cl.
CPC ......... *G09G 3/3225* (2013.01); *G02B 27/017* (2013.01); *G06F 3/0346* (2013.01); *G09G 3/2025* (2013.01); *G02B 2027/014* (2013.01); *G02B 2027/0178* (2013.01); *G09G 2310/08* (2013.01)

(58) Field of Classification Search
CPC .................................................... G09G 3/3225
USPC ......................................................... 345/165
See application file for complete search history.

(56) References Cited

U.S. PATENT DOCUMENTS

| 9,318,072 B2 | 4/2016 | Cha et al. |
| 9,405,135 B2 | 8/2016 | Sweis et al. |
| 10,074,303 B2 * | 9/2018 | Ha ........................ G02B 27/017 |
| 2006/0087502 A1 | 4/2006 | Karidis et al. |

(Continued)

FOREIGN PATENT DOCUMENTS

| CN | 1801268 A | 7/2006 |
| CN | 101373573 A | 2/2009 |

(Continued)

OTHER PUBLICATIONS

Chinese Search Report dated Dec. 28, 2018.
Indian Search Report dated Oct. 24, 2019.
Indian Search Report dated Mar. 17, 2020.

*Primary Examiner* — Jason C Olson
(74) *Attorney, Agent, or Firm* — Cha & Reiter, LLC

(57) ABSTRACT

A display method for a display device is provided. The display method comprises activating a Head Mounted Theater (HMT) mode, the HMT mode displaying two images which are substantially same each other on first and second areas respectively, separated from each other, in a display area of the display device; and adjusting a display time, for displaying a black screen in the first and second areas, of a unit frame time when the HMT mode is activated.

20 Claims, 47 Drawing Sheets

(56) References Cited

U.S. PATENT DOCUMENTS

| | | |
|---|---|---|
| 2006/0170822 A1 | 8/2006 | Baba et al. |
| 2007/0159426 A1 | 7/2007 | Shin |
| 2009/0051631 A1 | 2/2009 | Okumura et al. |
| 2010/0079356 A1 | 4/2010 | Hoellwarth |
| 2010/0149413 A1 | 6/2010 | Kumakawa |
| 2011/0090319 A1* | 4/2011 | Kim .................. G09G 3/003 348/51 |
| 2011/0148947 A1 | 6/2011 | Chen et al. |
| 2012/0068914 A1 | 3/2012 | Jacobsen et al. |
| 2012/0120058 A1* | 5/2012 | Lee .................. G09G 3/003 345/419 |
| 2012/0147025 A1 | 6/2012 | Pyo |
| 2012/0162134 A1 | 6/2012 | Chen et al. |
| 2012/0249525 A1 | 10/2012 | Ahn et al. |
| 2013/0057763 A1 | 3/2013 | Cha et al. |
| 2013/0169662 A1 | 7/2013 | Yun et al. |
| 2013/0307842 A1 | 11/2013 | Grinberg et al. |
| 2014/0233798 A1 | 8/2014 | Cho et al. |
| 2014/0266989 A1 | 9/2014 | Takahashi et al. |
| 2015/0370067 A1 | 12/2015 | Denduluri et al. |

FOREIGN PATENT DOCUMENTS

| | | |
|---|---|---|
| CN | 104007815 A | 8/2014 |
| EP | 2 463 756 A1 | 6/2012 |
| KR | 10-2013-0076132 A | 7/2013 |
| KR | 10-2014-0089345 A | 7/2014 |

* cited by examiner

< PIP mode >

< See-through mode >

| CONDITION INFORMATION | BLACK IMAGE PROVISION TIME WITHIN UNIT FRAME |
|---|---|
| 1 | 1/10 SEC |
| 2 | 1/20 SEC |
| 3 | 1/30 SEC |
| 4 | 1/40 SEC |

. . .

| | |
|---|---|
| 1 AND 2 | 1/15 SEC |
| 1 AND 3 | 1/30 SEC |

| SENSOR VALUE, X | BLACK IMAGE PROVISION TIME WITHIN UNIT FRAME |
|---|---|
| 0 < X ≤ 3 | 1/10 SEC |
| 1 < X ≤ 6 | 1/20 SEC |
| 6 < X ≤ 11 | 1/30 SEC |
| ... | |

FIG.20

| APPLICATION | BLACK IMAGE PROVISION TIME WITHIN UNIT FRAME |
|---|---|
| APPLICATION 1 | 1/10 SEC |
| APPLICATION 2 | 1/20 SEC |
| APPLICATION 3 | 1/30 SEC |
| APPLICATION 4 | 1/40 SEC |

| CONDITION INFORMATION | AID PERCENTAGE |
|---|---|
| 1 | 10 % |
| 2 | 20 % |
| 3 | 30 % |

. . .

| | |
|---|---|
| 1 AND 2 | 15 % |
| 1 AND 3 | 20 % |

| SENSOR VALUE, X | AID PERCENTAGE |
|---|---|
| 0 < X ≤ 3 | 10 % |
| 3 < X ≤ 6 | 15 % |
| 6 < X ≤ 11 | 20 % |
| ... | |

FIG.31

| APPLICATION | AID PERCENTAGE |
|---|---|
| APPLICATION 1 | 10 % |
| APPLICATION 2 | 10 % |
| APPLICATION 3 | 15 % |
| APPLICATION 4 | 20 % |

WEARABLE ELECTRONIC DEVICE

CROSS REFERENCE TO RELATED APPLICATIONS

This present application is a Continuation of U.S. patent application Ser. No. 14/841,876 filed on Sep. 1, 2015 which is related to and claims benefit under 35 U.S.C. § 119(a) to a Korean Application Serial No. 10-2014-0115739, which was filed in the Korean Intellectual Property Office on Sep. 1, 2014, the entire disclosure of which are hereby incorporated by reference.

TECHNICAL FIELD

Various example embodiments of the present disclosure relate to a wearable electronic device.

BACKGROUND

Recently, various electronic devices of a form directly wearable on the human body are being developed. These devices are commonly called wearable electronic devices. Examples of the wearable electronic devices can include a head-mounted display, smart glasses, a smart watch or wristband, a contact lens type device, a ring type device, a shoe type device, a clothes type device, a glove type device, etc., and have various forms being attachable to or detachable from a part of the human body or clothes. The wearable electronic devices are directly wearable on the human body to enhance their portability and user's accessibility.

One example of the wearable electronic devices is a device mountable on a user's head. Such a device can be, for example, called a Head-Mounted Display or Head-Mounted Device (HMD).

SUMMARY

One example embodiment of the present disclosure may enhance a picture quality of a display device (e.g., a smartphone) mounted on a head-mounted device.

According to an embodiment of the present disclosure, a display method for a display device is provided, the method comprising activating a Head Mounted Theater (HMT) mode, the HMT mode displaying two images which are substantially same each other on first and second areas respectively, separated from each other, in a display area of the display device, and adjusting a display time, for displaying a black screen in the first and second areas, of a unit frame time when the HMT mode is activated.

According to an embodiment of the present disclosure, a display method for a display device including an Organic Light Emitting Diode (OLED) is provided, the display method comprising activating a Head Mounted Theater (HMT) mode, the HMT mode display an image on first and second area, separated from each other, in a display area of the display device, and increasing a driving clock speed of an Organic Light Emitting Diode (OLED) circuit for driving the OLED in the HMT mode.

According to an embodiment of the present disclosure, a display device is provides, the display device comprising a controller configured to activate a Head Mounted Theater (HMT) mode, the HMT mode displaying two images which are substantially same each other on first and second areas respectively, separated from each other, in a display area of the display device, and adjust a display time, for displaying a black screen in the first and second areas, of a unit frame time when the HMT mode is activated.

According to an embodiment of the present disclosure, a display device is provided, the display device comprising an Organic Light Emitting Diode (OLED), an Organic Light Emitting Diode (OLED) circuit for driving the OLED, and a controller configured to activate a Head Mounted Theater (HMT) mode, the HMT mode display an image on first and second area, separated from each other, in a display area of the display device, and increase a driving clock speed of the OLED circuit in the HMT mode.

BRIEF DESCRIPTION OF THE DRAWINGS

For a more complete understanding of the present disclosure, reference is now made to the following description taken in conjunction with the accompanying drawings, in which like reference numerals represent like parts.

FIG. 19 and FIG. 20 are reference tables for explaining the flow of FIG. 18;

FIG. 24 is an example diagram for explaining the flow of FIG. 23;

FIG. 30 and FIG. 31 are reference tables for explaining the flow of FIG. 29;

FIG. 35 is a reference table for explaining the flow of FIG. 34;

DETAILED DESCRIPTION

Figure 1:
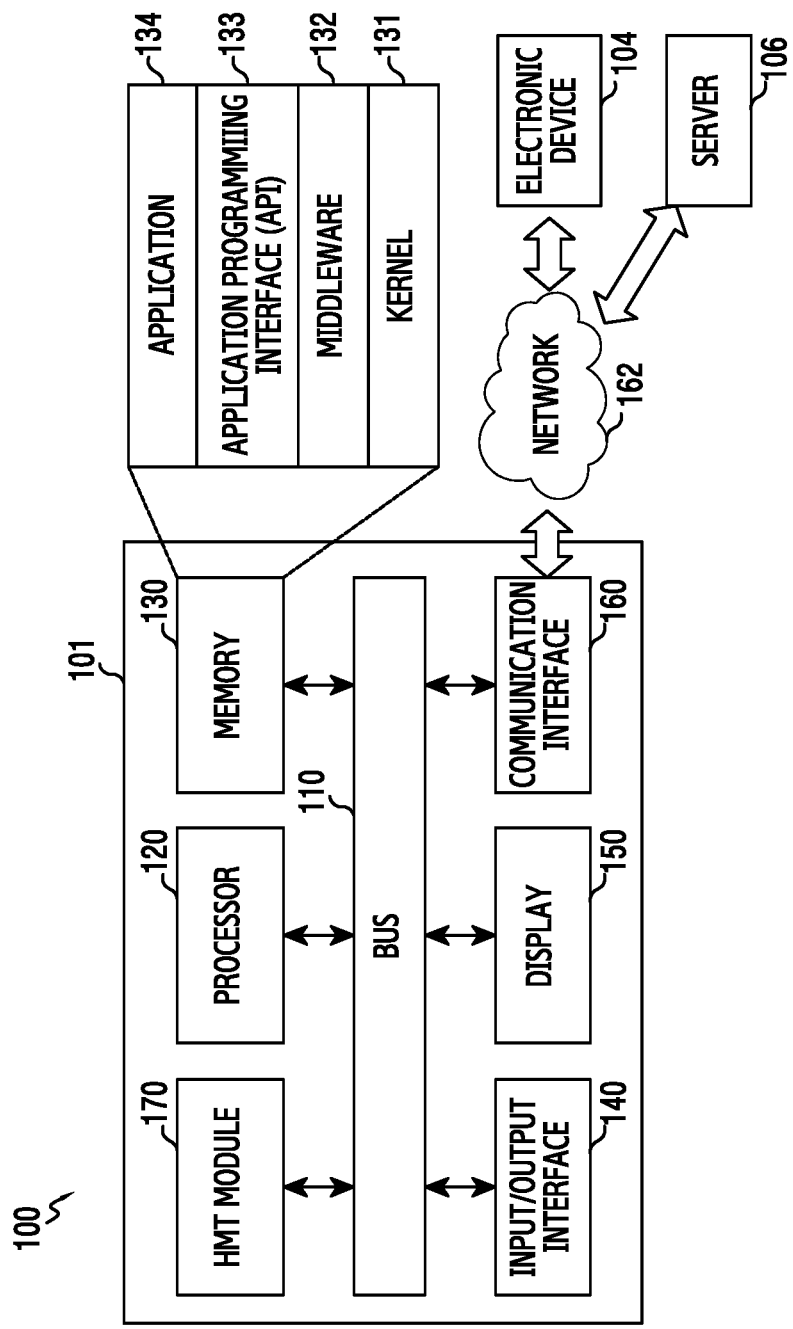
FIG. 1 illustrates a network environment including an electronic device according to various example embodiments of the present disclosure.

Various example embodiments of the present disclosure will be described herein below with reference to the accompanying drawings. Various example embodiments of the present disclosure may make various modifications and may have several example embodiments. So, specific example embodiments are illustrated in the drawings and a related detailed description is made. But, these do not intend to limit various example embodiments of the present disclosure to a specific embodiment form, and should be understood as including all modifications and/or equivalents or alternatives included in the various example embodiments of the present disclosure. In relation to a description of the drawings, like reference symbols denote like constituent elements.

The expressions "comprise" or "may comprise", etc. usable in various example embodiments of the present disclosure indicate the existence of disclosed corresponding functions, operations, or constituent elements, etc. and do not limit additional one or more functions, operations, or constituent elements, etc. Also, in various example embodiments of the present disclosure, the terms "comprise" or "have", etc. should be understood as being intended to designate the existence of features stated in the specification, numerals, steps, operations, constituent elements, components or a combination of them, and not previously excluding the possibility of existence or addition of one or more other features, numerals, steps, operations, constituent elements, components or combinations of them.

In various example embodiments of the present disclosure, the expressions "or", etc. include any and all combinations of words enumerated together. For example, "A or B" may include A, or may include B, or may include all A and B.

The expressions "1st", "2nd", "first" or "second", etc. used in various example embodiments of the present disclosure may modify various constituent elements of various example embodiments, but do not intend to limit corresponding constituent elements. For example, the expressions do not limit the order and/or importance of the corresponding constituent elements. The expressions may be used to distinguish one constituent element from another constituent element. For example, all of a first user device and a second user device are user devices, and represent user devices different from one another. For example, a first constituent element may be named as a second constituent element without departing from the various example embodiments of the present disclosure. Likely, even a second constituent element may be named as a first constituent element.

When it is mentioned that any constituent element is "connected" or "accessed" to another constituent element, it should be understood that the any constituent element may be not only directly connected or accessed to the another constituent element, but also the new third constituent element may exist between the any constituent element and the another constituent element. On the other hand, when it is mentioned that any constituent element is "directly connected" or "directly accessed" to another constituent element, it should be understood that no third constituent element exists between the any constituent element and the another constituent element.

The terms used in various example embodiments of the present disclosure are used to just explain specific example embodiments, and have no intention of limiting various example embodiments of the present disclosure. The expression of singular number includes the expression of plural number unless the context clearly dictates otherwise.

Unless defined otherwise, all terms used herein including technological or scientific terms have the same meaning as those commonly understood by a person having ordinary knowledge in the art which various example embodiments of the present disclosure belongs to. Terms as defined in a general dictionary should be interpreted as having meanings consistent with the contextual meanings of a related technology, and are not interpreted as ideal or excessively formal meanings unless defined clearly in various example embodiments of the present disclosure.

An electronic device according to various example embodiments of the present disclosure may be a device including a display function. For example, the electronic device may include at least one of a smart phone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MPEG Audio Layer 3 (MP3) player, a mobile medical instrument, a camera, or a wearable device (e.g., a Head-mounted Device (HMD) such as electronic glasses, electronic clothes, an electronic bracelet, an electronic necklace, an electronic appcessory, an electronic tattoo, or a smart watch).

According to some example embodiments, the electronic device may be a smart home appliance having a display function. The smart home appliance, for example, the electronic device may include at least one of a television, a Digital Video Disk (DVD) player, an audio system, a refrigerator, an air conditioner, a cleaner, an oven, a microwave, a washing machine, an air cleaner, a set-top box, a TV box (for example, Samsung HomeSync™, Apple TV™, or Google TV™), a game console, an electronic dictionary, an electronic locking system, a camcorder, or an electronic picture frame.

According to some example embodiments, the electronic device may include at least one of various medical instruments (e.g., Magnetic Resonance Angiography (MRA), Magnetic Resonance Imaging (MRI), Computerized Tomography (CT), a moving camera, an ultrasonic machine, etc.), a navigation device, a Global Positioning System (GPS) receiver, an Event Data Recorder (EDR), a Flight Data Recorder (FDR), a car infotainment device, an electronic equipment for ship (e.g., a navigation device for ship and a gyrocompass, etc.), avionics, a security instrument, a head unit for vehicles, an industrial or home service robot, an Automatic Teller's Machine (ATM) of a financial institution, or a Point Of Sales (POS) of a shop.

According to some example embodiments, the electronic device may include at least one of a part of furniture or building/structure including a display function, an electronic board, an electronic signature receiving device, a projector, or various metering instruments (e.g., tap water, electricity, gas, or radio wave metering instrument, etc.). The electronic device according to various example embodiments of the present disclosure may be one of the aforementioned various devices or a combination of two or more of them. Also, the electronic device according to various example embodiments of the present disclosure may be a flexible device. Also, that the electronic device according to various example embodiments of the present disclosure is not limited to the aforementioned instruments is obvious to those skilled in the art.

Below, an electronic device according to various example embodiments of the present disclosure will be described with reference to the accompanying drawings. The term 'user' used in various example embodiments of the present disclosure may denote a person who uses the electronic device or a device (e.g., an artificial-intelligence electronic device) which uses the electronic device.

FIG. 1 illustrates a network environment 100 including an electronic device according to various example embodiments of the present disclosure.

Referring to FIG. 1, the electronic device 101 may include a bus 110, a processor 120, a memory 130, an input/output interface 140, a display 150, a communication interface 160, and a Head-Mounted Theater (HMT) module 170.

According to one example embodiment, the HMT module 170 is implementable by software (S/W) or hardware (H/W), or a combination of the S/W and the H/W. The S/W is stored in the memory 130, and the H/W is implementable as a separate circuit or Integrated Circuit (IC) and may be integrated in the processor 120, a Display Driver IC (DDI) or a display related IC, etc.

The HMT module 170 may enhance a picture quality of a screen in accordance with setting of an adaptive screen. According to one example embodiment, if it is a stereoscopic mode or a mode in which a similar or same image is separated and displayed for both eyes, the HMT module 170 may set the adaptive screen.

According to another example embodiment, the HMT module 170 may set the adaptive screen in accordance with wearing or non-wearing of an HMD (for example, checking the wearing or non-wearing of the HMD using an acceleration sensor, a bio sensor, a proximity sensor, a capacitive sensor, a physical hardware button, etc.).

According to another example embodiment, the HMT module 170 may set the adaptive screen in accordance with a user's manual input.

According to a further example embodiment, the HMT module 170 may provide a menu provided in a state in which an HMD is mounted on the electronic device 101 and, if there is a user's selective input through the menu, the HMT module 170 may set the adaptive screen.

According to another example embodiment, if there is a wired or wireless functional connection between the electronic device 101 and the HMD, the HMT module 170 may set the adaptive screen.

The bus 110 may be a circuit connecting the aforementioned constituent elements with one another and forwarding communication (e.g., a control message) between the aforementioned constituent elements.

The processor 120 may, for example, receive a request or data or signal from the aforementioned other constituent elements (e.g., the memory 130, the input/output interface 140, the display 150, the communication interface 160, or the HMT module 170, etc.) through the bus 110, and process operation or data according to the received request or data or signal to control the constituent elements.

The memory 130 may store an instruction or data that is received from the processor 120 or the other constituent elements (e.g., the input/output interface 140, the display 150, the communication interface 160 or the HMT module 170, etc.) or is generated by the processor 120 or the other constituent elements. The memory 130 may include, for example, programming modules such as a kernel 131, a middleware 132, an Application Programming Interface (API) 133, or an application 134, etc. The aforementioned programming modules each may include software, firmware, hardware or a combination of at least two or more of them.

The kernel 131 may control or manage system resources (e.g., the bus 110, the processor 120, or the memory 130, etc.) used to execute operations or functions implemented in the remnant other programming modules, for example, the middleware 132, the API 133, or the application 134. Also, the kernel 131 may provide an interface of enabling the middleware 132, the API 133, or the application 134 to access and control or manage the individual constituent element of the electronic device 101.

The middleware 132 may perform a relay role of enabling the API 133 or the application 134 to communicate and exchange data with the kernel 131. Also, in relation to work requests received from the application 134, the middleware 132 may, for example, perform control (e.g., scheduling or load balancing) of the work requests by using a method of allocating at least one application among the applications 134 priority order capable of making use of the system resources (e.g., the bus 110, the processor 120, or the memory 130, etc.) of the electronic device 101.

The API 133, which is an interface of enabling the application 134 to control a function provided by the kernel 131 or the middleware 132, may include, for example, at least one interface or function (e.g., instruction) for file control, window control, picture processing, or character control, etc.

According to various example embodiments, the application 134 may include a Short Message Service/Multimedia Message Service (SMS/MMS) application, an electronic mail (e-mail) application, a calendar application, an alarm application, a health care application (e.g., an application measuring a quantity of motion or blood sugar), or environment information application (e.g., an application providing air pressure, humidity or temperature information, etc.), etc. Additionally or alternatively, the application 134 may be an application related with information exchange between the electronic device 101 and an external electronic device (e.g., an electronic device 104). The application related with the information exchange may include, for example, a notification relay application for relaying specific information to the external electronic device, or a device management application for managing the external electronic device.

For example, the notification relay application may include a function of relaying notification information generated in another application (e.g., the SMS/MMS application, the e-mail application, the health care application, or the environment information application, etc.) of the electronic device 101 to the external electronic device (e.g., the electronic device 104). Additionally or alternatively, the notification relay application may, for example, receive notification information from the external electronic device (e.g., the electronic device 104) and provide the received notification information to a user. The device management application may, for example, manage (e.g., install, delete or update) a function of at least a part of the external electronic device (e.g., the electronic device 104) communicating with the electronic device 101 (e.g., turn-on/turn-off of the external electronic device itself (or some constituent components) or adjustment of a brightness (or resolution) of a display), and an application operating in the external electronic device or a service (e.g., a telephony service or a message service) provided in the external electronic device.

According to various example embodiments, the application 134 may include an application designated according to an attribute of the external electronic device (e.g., the electronic device 104) (e.g., the kind of the electronic device). For example, in case that the external electronic device is an MP3 player, the application 134 may include an application related with music playback. Similarly, in case that the external electronic device is a mobile medical instrument, the application 134 may include an application related with health care. According to one example embodiment, the application 134 may include at least one of an application designated to the electronic device 101 or an application received from the external electronic device (e.g., the server 106 or the electronic device 104).

The input/output interface 140 may forward an instruction or data inputted from a user through an input/output device (e.g., a sensor, a keyboard or a touch screen), for example, to the processor 120, the memory 130, the communication interface 160, or the HMT module 170 through the bus 110. For example, the input/output interface 140 may provide data about a user's touch inputted through the touch screen, to the processor 120. Also, the input/output interface 140 may, for example, output through an input/output device (e.g., a speaker or a display) an instruction or data received from the processor 120, the memory 130, the communication interface 160, or the HMT module 170 through the bus 110. For example, the input/output interface 140 may output voice data, which is processed through the processor 120, to the user through the speaker.

The display 150 (or display module) may display various information (e.g., multimedia data or text data, etc.) to a user. For example, the display 150 may include a display panel (e.g., a Liquid Crystal Display (LCD) panel or an Organic Light-Emitting Diode (OLED) panel) and a Display Driver IC (DDI). The DDI may adjust picture elements (pixels) of the display panel and allow the display 150 to exhibit colors. For example, the DDI may include a circuit for converting a digital signal into a Red, Green, Blue (RGB) analog value and forwarding the RGB analog value to the display panel.

According to one example embodiment, the display 150 may include the OLED panel. The OLED panel may include a panel circuit for implementing colors of pixel regions (or pixels). The panel circuit may include an array of a plurality of OLED light-emitting elements arranged on a screen. Each of the OLED light-emitting elements may form a pixel. The OLED light-emitting elements are configured in a structure having a cathode electrode, an anode electrode, and organic light-emitting materials deposited between the cathode electrode and the anode electrode. An electric current may flow in the organic lighting-emitting materials between the two electrodes and thus, the organic light-emitting materials may give out light using an electroluminescence phenomenon.

The OLED panel may implement colors using a three-color (Red, Green, Blue) independent pixel scheme, a Color Change Media (CCM), a color filter scheme, etc. For example, the OLED panel may express a dot (it refers to a unit of expressing one color) by a combination of OLED light-emitting elements having three colors (Red, Green, Blue).

The OLED panel may be one of a Passive-Matrix Organic Light-Emitting Diode (PMOLED) panel or an AMOLED panel. For example, the AMOLED panel may embed a Thin Film Transistor (TFT) every AMOLED light-emitting element to individually control the emission or non-emission of each AMOLED light-emitting element. Here, if a forward voltage is applied to the TFT, an electric current flows in the organic light-emitting materials at a certain threshold voltage or more and thus, the organic light-emitting materials may give out light. Here, the more the electric current flowing in the organic light-emitting materials is, the brighter the organic light-emitting materials give out light. In contrast, if a reverse voltage is applied to the TFT, the electronic current almost does not flow in the organic light-emitting materials and thus, the organic light-emitting materials may not give out light.

The OLED panel may include a plurality of pixel regions and a black matrix region. Each of the plurality of pixel regions may be a minimal unit forming a picture. The plurality of pixel regions may be generally of the same shape, and may be arranged regularly side by side in a row direction (e.g., an X-axis direction) or in a column direction (e.g., a Y-axis direction), but it is not limited to this. One dot, which is a unit of expressing one color, may form a pixel group including the pixel regions (e.g., a Red pixel region, a Green pixel region, and a Blue pixel region) capable of giving out light of three colors (Red, Green, Blue). The pixel group (e.g., the three pixel regions) may be arranged repeatedly in the row direction (e.g., the X-axis direction) or in the column direction (e.g., the Y-axis direction). Also, the pixel group is not limited to the three pixel groups, and may include more pixel regions. The aforementioned organic light-emitting materials may be arranged in the pixel regions. The black matrix region may be separate from the pixel regions and may distinguish the pixel regions. For example, the black matrix region may include a black matrix of a color filter or include a separator separating between the AMOLED light-emitting elements. The aforementioned TFT and at least a part of its related circuit (e.g., the OLED panel circuit for implementing colors of pixels) may be arranged in the black matrix region.

According to another example embodiment of the present disclosure, the display 150 may also include an LCD panel. The LCD panel may include a panel circuit for implementing colors of pixel regions (or pixels). The panel circuit may include a TFT substrate, a color filter substrate and a liquid crystal, etc.

The TFT substrate may include a gate line, a data line, a pixel electrode and a TFT. The gate line (or scanning signal line) may be arranged between the pixel regions and forward a scanning signal or gate signal. The data line may be at right angles with the gate line, and may be arranged between the pixel regions and forward a data signal. The TFT may be arranged at an intersection of the gate line and the data line. The pixel electrode may be arranged in the pixel region. The TFT may include a gate electrode electrically connected with the gate line, a source electrode electrically connected with the data line, and a drain electrode electrically connected with the pixel electrode.

The color filter substrate may include a filter pattern (e.g., a color filter pattern and a black matrix pattern) implementing colors and a common electrode (e.g., Indium Tin Oxide (ITO)). The color filter pattern (e.g., a Red color filter pattern, a Green filter pattern, and a Blue filter pattern) may be arranged in the pixel regions. The black matrix pattern (e.g., black color pattern) may be separated from the color filter pattern. The common electrode may be arranged between the filter pattern and a liquid crystal.

The liquid crystal may be arranged between the TFT substrate and the color filter substrate. An electric field between the pixel electrode of the TFT substrate and the common electrode of the color filter substrate changes an array of molecules of the liquid crystal. Light from an external light source (e.g., a backlight unit or Sun) transmits the liquid crystal and the color filter pattern and according to this, the pixel region may give out light.

The LCD panel may include a plurality of pixel regions and a black matrix region. Each of the plurality of pixel regions may be a minimal unit forming a picture. The plurality of pixel regions may be generally of the same shape, and may be arranged regularly side by side in a row direction (e.g., an X-axis direction) or in a column direction (e.g., a Y-axis direction), but it is not limited to this. One dot, which is a unit expressing one color, may form a pixel group including three pixel regions (e.g., a Red pixel region, a Green pixel region, and a Blue pixel region). Here, the three pixel regions (i.e., the Red pixel region, the Green pixel region, and the Blue pixel region) forming the pixel group each may give out light of red color, light of green color, and light of blue color by light passing through a red color filter pattern, a green color filter pattern, and a blue color filter pattern of the aforementioned color filter substrate. Or, the pixel group is not limited to the three pixel regions and may include more pixel regions as well. The black matrix region is separated from the pixel regions. For example, the black matrix region may be arranged in the pixel regions and distinguish the pixel regions. The black matrix region may cut off light by the black matrix pattern of the aforementioned color filter substrate. The panel circuit (e.g., the gate line of the TFT substrate, the data line and the TFT, etc.) implementing colors of the pixel regions may be arranged in the black matrix region.

The communication interface 160 may establish communication between the electronic device 101 and the external device (e.g., the electronic device 104 or the server 106). For example, the communication interface 160 may be connected to a network 162 through wireless communication or wired communication, to communicate with the external device. The wireless communication may include, for example, at least one of Wireless Fidelity (WiFi), Bluetooth (BT), Near Field Communication (NFC), GPS or cellular communication (e.g., Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile Communications (GSM)). The wired communication may include, for example at least one of a Universal Serial Bus (USB), a High Definition Multimedia Interface (HDMI), a Recommended Standard-232 (RS-232), or a Plain Old Telephone Service (POTS).

According to one example embodiment, the network 162 may be a telecommunications network. The telecommunications network may include at least one of a computer network, the Internet, Internet of Things (IoT), or a telephone network. According to one example embodiment, a protocol (e.g., a transport layer protocol, a data link layer protocol, or a physical layer protocol) for communication between the electronic device 101 and the external device may be supported in at least one of the application 134, the application programming interface 133, the middleware 132, the kernel 131, or the communication interface 160.

The HMT module 170 may process at least a part of information acquired from other constituent elements (e.g., the processor 120, the memory 130, the input/output interface 140, or the communication interface 160, etc.), and provide this to a user in various methods. For example, the HMT module 170 may control at least a partial function of the electronic device 101 such that the electronic device 101 interworks with other electronic devices (e.g., the electronic device 104 or the server 106), using the processor 120 or independently of this. According to one example embodiment, at least one implementation of the HMT module 170 may be included in the server 106 or receive a support of at least one operation implemented in the HMT module 170 from the server 106. Additional information about the HMT module 170 is provided through FIG. 2 to FIG. 45 described later.

Figure 2:
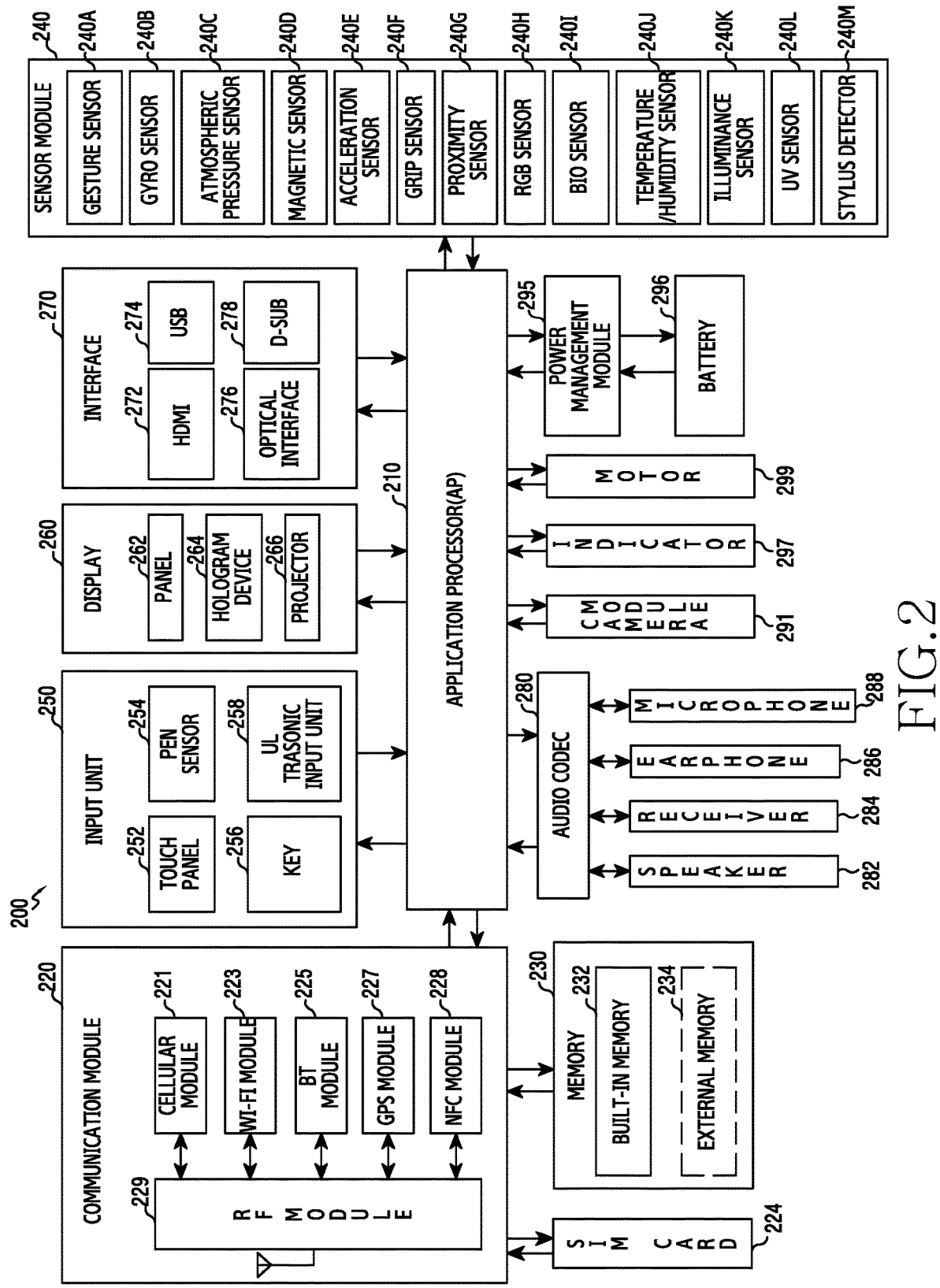
FIG. 2 is a block diagram illustrating an electronic device according to various example embodiments of the present disclosure.

FIG. 2 is a block diagram illustrating an implementation of an electronic device (e.g., a smartphone) according to various example embodiments of the present disclosure. The electronic device 200 may implement, for example, the whole or part of the electronic device 101 illustrated in FIG. 1.

Referring to FIG. 2, the electronic device 200 may include one or more Application Processors (APs) 210, a communication module 220, a Subscriber Identification Module (SIM) card 224, a memory 230, a sensor module 240, an input device 250, a display 260, an interface 270, an audio module 280, a camera module 291, a power management module 295, a battery 296, an indicator 297, and a motor 299.

The AP 210 may run an operating system or an application program to control a plurality of hardware or software constituent elements connected to the AP 210, and may perform processing and operation of various data including multimedia data. The AP 210 may be, for example, implemented as a System On Chip (SoC). According to one example embodiment, the AP 210 may further include a Graphic Processing Unit (GPU) (not shown).

The communication module 220 may perform data transmission/reception in communication between the electronic device 200 (e.g., the electronic device 101) and other electronic devices connected through a network. According to one example embodiment, the communication module 220 may include a cellular module 221, a WiFi module 223, a BT module 225, a GPS module 227, an NFC module 228, and a Radio Frequency (RF) module 229.

The cellular module 221 may provide voice telephony, video telephony, a text service, or an Internet service, etc. through a telecommunication network (e.g., LTE, LTE-A, CDMA, WCDMA, UMTS, WiBro, or GSM, etc.). Also, the cellular module 221 may, for example, use a subscriber identification module (e.g., the SIM card 224) to perform electronic device distinction and authentication within the telecommunication network. According to one example embodiment, the cellular module 221 may perform at least some functions among functions that the AP 210 may provide. For example, the cellular module 221 may perform at least a part of a multimedia control function.

According to one example embodiment, the cellular module 221 may include a Communication Processor (CP). Also, the cellular module 221 may be, for example, implemented as a SoC. In FIG. 2, the constituent elements such as the cellular module 221 (e.g., the communication processor), the memory 230, or the power management module 295, etc. are illustrated as constituent elements separate from the AP 210 but, according to one example embodiment, the AP 210 may be implemented to include at least some (e.g., the cellular module 221) of the aforementioned constituent elements.

According to one example embodiment, the AP 210 or the cellular module 221 (e.g., the communication processor) may load an instruction or data, which is received from a non-volatile memory connected to each or at least one of other constituent elements, to a volatile memory and process the loaded instruction or data. Also, the AP 210 or the cellular module 221 may store data, which is received from at least one of other constituent elements or is generated by at least one of the other constituent elements, in the non-volatile memory.

The WiFi module 223, the BT module 225, the GPS module 227 or the NFC module 228 each may include, for example, a processor for processing data transmitted/received through the corresponding module. In FIG. 2, the cellular module 221, the WiFi module 223, the BT module 225, the GPS module 227 or the NFC module 228 is each illustrated as a separate block but, according to one example embodiment, at least some (e.g., two or more) of the cellular module 221, the WiFi module 223, the BT module 225, the GPS module 227 or the NFC module 228 may be included within one Integrated Chip (IC) or IC package. For example, at least some (e.g., the communication processor corresponding to the cellular module 221 and a WiFi processor corresponding to the WiFi module 223) of the processors each corresponding to the cellular module 221, the WiFi module 223, the BT module 225, the GPS module 227 or the NFC module 228 may be implemented as one SoC.

The RF module 229 may perform transmission/reception of data, for example, transmission/reception of an RF signal. Though not illustrated, the RF module 229 may include, for example, a transceiver, a Power Amplifier Module (PAM), a frequency filter, or a Low Noise Amplifier (LNA), etc. Also, the RF module 229 may further include a component for transmitting/receiving an electromagnetic wave in a free space for wireless communication, for example, a conductor or a conductive wire, etc. FIG. 2 illustrates that the cellular module 221, the WiFi module 223, the BT module 225, the GPS module 227 and the NFC module 228 share one RF module 229 with one another but, according to one example embodiment, at least one of the cellular module 221, the WiFi module 223, the BT module 225, the GPS module 227 or the NFC module 228 may perform transmission/reception of an RF signal through a separate RF module.

The SIM card 224 may be a card including a subscriber identification module, and may be inserted into a slot provided in a specific position of the electronic device 200. The SIM card 224 may include unique identification information (e.g., an Integrated Circuit Card ID (ICCID)) or subscriber information (e.g., an International Mobile Subscriber Identity (IMSI)).

The memory 230 (e.g., the memory 130) may include an internal memory 232 or an external memory 234. The internal memory 232 may include, for example, at least one of a volatile memory (for example, a Dynamic Random Access Memory (DRAM), a Static RAM (SRAM), a Synchronous Dynamic RAM (SDRAM), etc.) or a non-volatile memory (for example, a One-Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a Not AND (NAND) flash memory, a Not OR (NOR) flash memory, etc.).

According to one example embodiment, the internal memory 232 may be a Solid State Drive (SSD). The external memory 234 may further include a flash drive, for example, Compact Flash (CF), Secure Digital (SD), micro-SD, mini-SD, extreme Digital (xD), or a memory stick, etc. The external memory 234 may be operatively connected with the electronic device 200 through various interfaces. According to one example embodiment, the electronic device 200 may further include a storage device (or a storage media) such as a hard drive.

The sensor module 240 may measure a physical quantity or sense an activation state of the electronic device 200, to convert measured or sensed information into an electric signal. The sensor module 240 may include, for example, at least one of a gesture sensor 240A, a gyro sensor 240B, an air pressure sensor 240C, a magnetic sensor 240D, an acceleration sensor 240E, a grip sensor 240F, a proximity sensor 240G, a color sensor 240H (e.g., an RGB sensor), a bio sensor 240I, a temperature/humidity sensor 240J, an illumination or illuminance sensor 240K, or a Ultraviolet (UV) sensor 240L, and a stylus detector 240M. Additionally or alternatively, the sensor module 240 may include, for example, an E-nose sensor (not shown), an Electromyography (EMG) sensor (not shown), an Electroencephalogram (EEG) sensor (not shown), an Electrocardiogram (ECG) sensor (not shown), an Infrared (IR) sensor (not shown), an iris sensor (not shown), or a fingerprint sensor (not shown), etc. The sensor module 240 may further include a control circuit for controlling at least one or more sensors belonging therein. Though not illustrated, the sensor module 240 may include a sensor mounted on a button device as well. The sensor mounted on the button device may be one of the aforementioned sensors.

The input device 250 may include a touch panel 252, a (digital) pen sensor 254, a key 256, or an ultrasonic input device 258. The touch panel 252 may, for example, detect a touch input in at least one of a capacitive overlay scheme, a pressure sensitive scheme, an infrared beam scheme, or an acoustic wave scheme. Also, the touch panel 252 may also further include a control circuit. In a case of the capacitive overlay scheme, physical contact or proximity detection is possible. The touch panel 252 may also further include a tactile layer. In this case, the touch panel 252 may provide a tactile response to a user.

The (digital) pen sensor 254 may be implemented in the same or similar method to receiving a user's touch input or by using a separate sheet for detection. The key 256 may include, for example, a physical button, an optical key, or a keypad. The key 256 may be implemented by the aforementioned button device as well. The ultrasonic input device 258 is a device capable of identifying data by sensing a sound wave with a microphone in the electronic device 200 through an input tool generating an ultrasonic signal, and enables wireless detection. According to one example embodiment, the electronic device 200 may also use the communication module 220 to receive a user's input from an external device (e.g., a computer or a server) connected with this.

The display 260 may include a panel 262, a hologram device 264, or a projector 266. The panel 262 may, for example, be an LCD or an AMOLED, etc. The panel 262 may be implemented to be flexible, transparent, or wearable. The panel 262 may be also implemented as one module along with the touch panel 252. The hologram device 264 may show a three-dimensional image in the air by using interference of light. The projector 266 may project light to a screen to display an image. The screen may be, for example, located inside or outside the electronic device 200. According to one example embodiment, the display 260 may further include a control circuit for controlling the panel 262, the hologram device 264, or the projector 266.

According to one example embodiment, the panel 262 may be controlled according to an adaptive screen of an HMT mode of the aforementioned HMT module 170.

The interface 270 may include, for example, a HDMI 272, a USB 274, an optical interface 276, or a D-subminiature (D-sub) 278. Additionally or alternatively, the interface 270 may include, for example, a Mobile High-definition Link (MHL) interface, a Secure Digital (SD) card/Multi Media Card (MMC) interface or an Infrared Data Association (IrDA) standard interface.

The audio module 280 may convert a voice and an electric signal interactively. The audio module 280 may, for example, process sound information which is inputted or outputted through a speaker 282, a receiver 284, an earphone 286, or the microphone 288, etc.

The camera module 291 is a device able to take a still picture and a moving picture. According to one example embodiment, the camera module 291 may include one or more image sensors (e.g., a top sensor or a bottom sensor), a lens (not shown), an Image Signal Processor (ISP) (not shown), or a flash (not shown) (e.g., a Light-emitting Diode (LED) or a xenon lamp).

The power management module 295 may manage electric power of the electronic device 200. Though not illustrated, the power management module 295 may include, for example, a Power Management Integrated Circuit (PMIC), a charger IC, or a battery or fuel gauge.

The PMIC may be, for example, mounted within an integrated circuit or a SoC semiconductor. A charging scheme may be divided into a wired charging scheme and a wireless charging scheme. The charger IC may charge the battery 296, and may prevent the inflow of overvoltage or overcurrent from an electric charger. According to one example embodiment, the charger IC may include a charger IC for at least one of the wired charging scheme or the wireless charging scheme. The wireless charging scheme may, for example, be a magnetic resonance scheme, a magnetic induction scheme, or an electromagnetic wave scheme, etc. A supplementary circuit for wireless charging, for example, a circuit such as a coil loop, a resonance circuit, or a rectifier, etc. may be added.

The battery gauge may, for example, measure a level of the battery 296, a voltage during charging, a current or a temperature. The battery 296 may generate or store electricity, and use the stored or generated electricity to supply power to the electronic device 200. The battery 296 may include, for example, a rechargeable battery or a solar battery.

The indicator 297 may display a specific status of the electronic device 200 or a part (e.g., the AP 210) thereof, for example a booting state, a message state, or a charging state, etc. The motor 299 may convert an electric signal into a mechanical vibration. Though not illustrated, the electronic device 200 may include a processing device (e.g., a GPU) for mobile TV support. The processing device for mobile TV support may, for example, process media data according to the standards of Digital Multimedia Broadcasting (DMB), Digital Video Broadcasting (DVB), or a media flow, etc.

Figure 3:
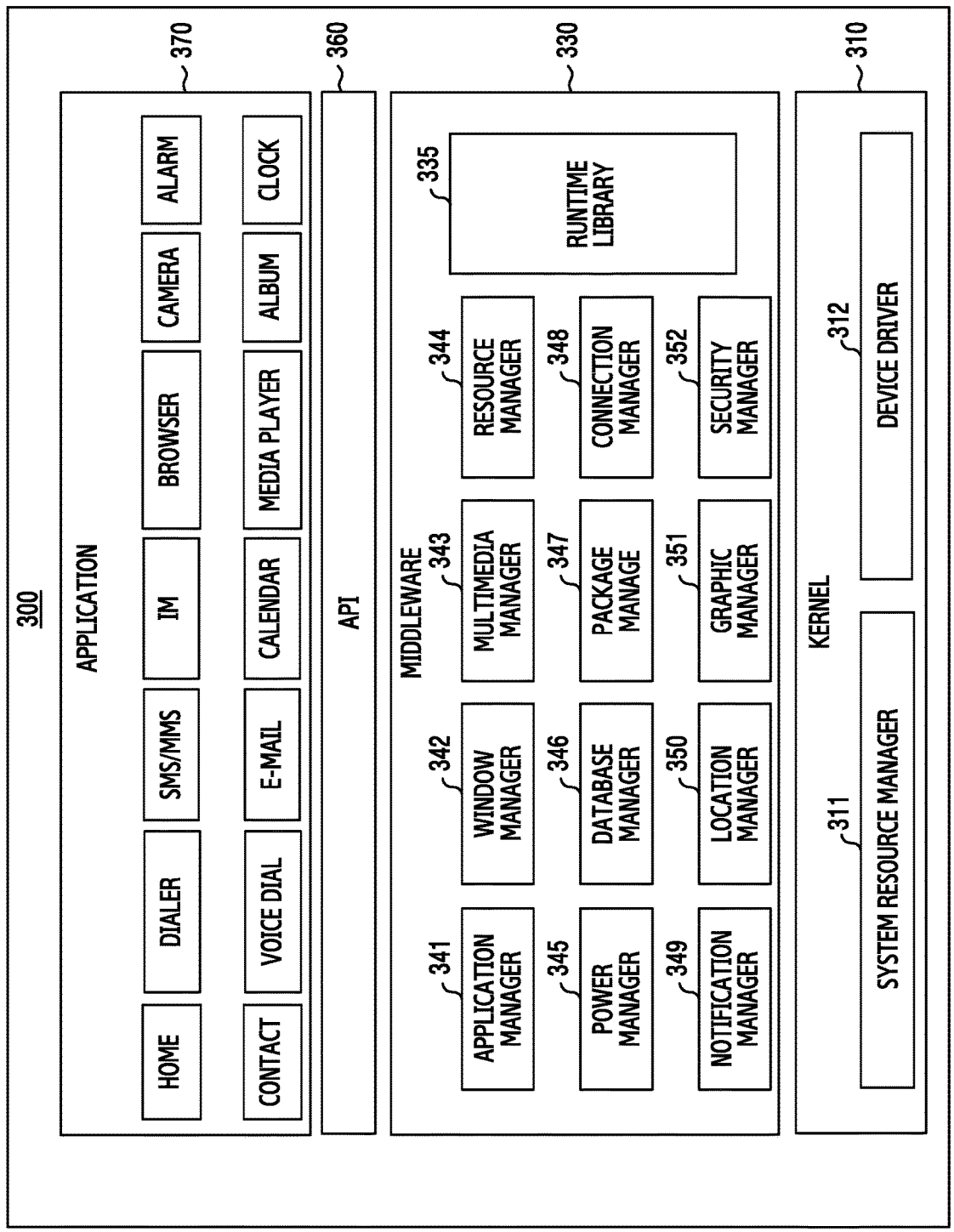
FIG. 3 is a block diagram illustrating a programming module according to various example embodiments of the present disclosure.

FIG. 3 is a block diagram illustrating a programming module according to various example embodiments of the present disclosure. The programming module 300 may be included (e.g., stored) in the electronic device 100 (e.g., the memory 130) illustrated in FIG. 1. At least a part of the programming module 300 may be implemented by software, firmware, hardware, or a combination of at least two or more of them. The programming module 300 may include an Operating System (OS) implemented in hardware (e.g., the electronic device 200) and controlling resources related to the electronic device (e.g., the electronic device 101), or various applications (e.g., the application 370) run on the operating system. For example, the operating system may be Android, iPhone OS (iOS), Windows, Symbian, Tizen, or Bada, etc. Referring to FIG. 3, the programming module 300 may include a kernel 310, a middleware 330, an API 360, or an application 370.

The kernel 310 (e.g., the kernel 131) may include a system resource manager 311 or a device driver 312. The system resource manager 311 may include, for example, a process management unit, a memory management unit, or a file system management unit, etc. The system resource manager 311 may perform control of a system resource, allocation thereof, or recovery thereof, etc. The device driver 312 may include, for example, a display driver, a camera driver, a Bluetooth driver, a shared memory driver, a USB driver, a keypad driver, a WiFi driver, or an audio driver. The device driver 312 may include an Inter-Process Communication (IPC) driver (not shown).

The middleware 330 may include a plurality of modules previously implemented to provide functions that the applications 370 commonly use. The middleware 330 may provide the functions through the API 360 such that the applications 370 may make efficient use of restricted system resources within the electronic device. For example, as illustrated in FIG. 3, the middleware 330 (e.g., the middleware 132) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that a compiler uses to add a new function through a programming language while the application 370 is run. The runtime library 335 may perform a function of input/output, memory management, or arithmetic function, etc.

The application manager 341 may manage, for example, a life cycle of at least one application among the applications 370. The window manager 342 may manage a GUI resource used in a screen. The multimedia manager 343 may detect a format which can be used for playing various media files, and perform encoding or decoding of the media file using a codec suitable to the corresponding format. The resource manager 344 may manage a resource of a source code of at least any one application among the applications 370, a memory thereof, or a storage space thereof, etc.

The power manager 345 may operate together with a Basic Input/Output System (BIOS), etc. to manage a battery or power source, and provide electric power information, etc. which can be used for the operation. The database manager 346 may manage to create, search or change a database that will be used in at least one application among the applications 370. The package manager 347 may manage installation or updating of an application which is distributed in a form of a package file.

The connectivity manager 348 may manage, for example, wireless connectivity such as WiFi or Bluetooth, etc. The notification manager 349 may display or notify an event such as an arrival message, an appointment, a proximity notification, etc. in a way of not disturbing a user. The location manager 350 may manage location information of the electronic device. The graphic manager 351 may manage a graphic effect to be provided to the user or a user interface related to this. The security manager 352 may provide a general security function which can be used for system security or user authentication, etc. If the electronic device (e.g., the electronic device 101) has a phone function, the middleware 330 may further include a telephony manager (not shown) for managing a voice or video telephony function of the electronic device.

The middleware 330 may create and use a new middleware module through a combination of various functions of the aforementioned internal constituent element modules. The middleware 330 may provide a module that is specialized by kind of an operating system to provide a distinguished function. The middleware 330 may dynamically delete some of the existing constituent elements or add new constituent elements. The middleware 330 may omit some of the constituent elements stated in various example embodiments of the present disclosure or further include other constituent elements or substitute the constituent elements with constituent elements having different names performing similar functions.

The API 360 (e.g., the API 133), a set of API programming functions, may be provided to have a different implementation in accordance to the operating system. For example, in a case of Android or iOS, it may provide one API set by platform for example and, in a case of Tizen, it may provide two or more API sets by platform for example.

The applications 370 (e.g., the applications 134) may include, for example, a preloaded application or a third party application.

At least a part of the programming module 300 may be implemented by an instruction stored in a computer-readable storage media. In case that the instruction is executed by one or more processors (e.g., the processor 120), the one or more processors may perform a function corresponding to the instruction. The computer-readable storage media may be, for example, the memory 130. At least a part of the programming module 300 may be implemented (e.g., executed) by the processor 120, for example. At least a part of the programming module 300 may include, for example, a module, a program, a routine, an instruction set, or a process, etc. for performing one or more functions.

The names of the constituent elements of the programming module (e.g., the programming module 300) according to various example embodiments of the present disclosure may be different in accordance to the kind of the operating system. The programming module according to various example embodiments of the present disclosure may include at least one or more of the aforementioned constituent elements, or omit some of the aforementioned constituent elements, or further include additional other constituent elements.

Each of the aforementioned constituent elements of the electronic device according to various example embodiments of the present disclosure may include one or more components, and a name of the corresponding constituent element may be different according to the kind of the electronic device. The electronic device according to various example embodiments of the present disclosure may include at least one of the aforementioned constituent elements, and may omit some constituent elements or further include additional other constituent elements. Also, some of the constituent elements of the electronic device according to various example embodiments of the present disclosure may be combined to form one entity, thereby identically performing the functions of the corresponding constituent elements before combination.

Figure 4:
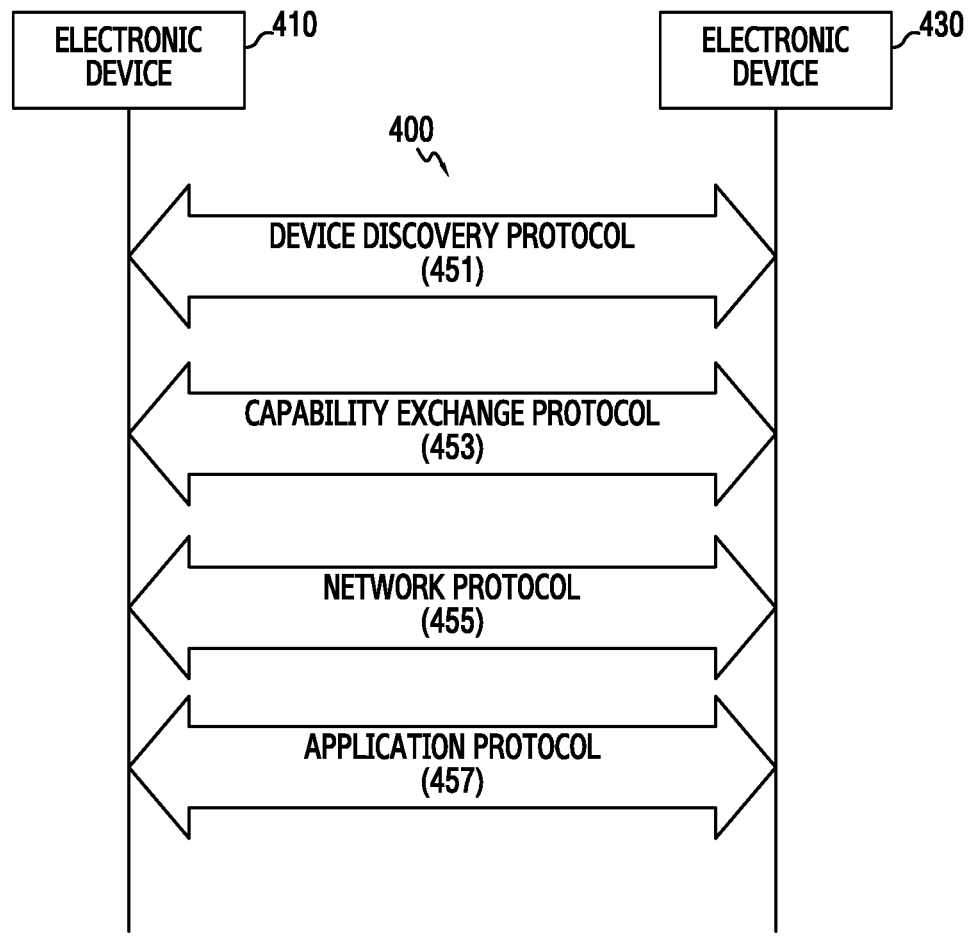
FIG. 4 illustrates a communication protocol between a plurality of electronic devices according to various example embodiments of the present disclosure.

FIG. 4 illustrates a communication protocol between a plurality of electronic devices according to various example embodiments of the present disclosure.

Referring to FIG. 4, for example, the communication protocol 400 may include a device discovery protocol 451, a capability exchange protocol 453, a network protocol 455 and/or an application protocol 457, etc.

According to one example embodiment, the device discovery protocol 451 may be a protocol for allowing electronic devices (e.g., an electronic device 410 or an electronic device 430) to sense an external electronic device able to communicate with themselves or connect with the sensed external electronic device. For example, the electronic device 410 (e.g., the electronic device 101) is a device for using the device discovery protocol 451 to communicate with the electronic device 430 through a communication method (e.g., WiFi, BT or USB, etc.) usable in the electronic device 410, and may sense the electronic device 430 (e.g., the electronic device 104) (for example, a head-mounted device 1200). For the sake of communication connection with the electronic device 430, the electronic device 410 may use the device discovery protocol 451 to acquire and store identification information about the sensed electronic device 430. Based on at least identification information, the electronic device 410 may establish communication connection with the electronic device 430, for example.

According to some example embodiments, the device discovery protocol 451 may be a protocol for mutual authentication between a plurality of electronic devices. For example, the electronic device 410 may perform authentication between the electronic device 410 and the electronic device 430, based on communication information (e.g., a Media Access Control (MAC) address, a Universally Unique IDentifier (UUID), a SubSystem IDentification (SSID), an Internet Protocol (IP) address) for connection with at least the electronic device 430.

According to one example embodiment, the capability exchange protocol 453 may be a protocol for exchanging information related to a function of a service able to be supported by at least one of the electronic device 410 or the electronic device 430. For example, the electronic devices 410 and 430 may exchange the information related to the function of the service that is being currently provided by each of the electronic devices 410 and 430, through the capability exchange protocol 453. The exchangeable information may include identification information indicating a specific service among a plurality of services able to be supported by the electronic devices 410 and 430. For example, the electronic device 410 may receive the identification information of the specific service, which is provided by the electronic device 430, from the electronic device 430 through the capability exchange protocol 453. In this case, based on the received identification information, the electronic device 410 may determine if the electronic device 410 may support the specific service.

According to one example embodiment, the network protocol 455 may be a protocol for, for example, controlling a data flow that is transmitted/received to provide a service between interworking electronic devices (e.g., the electronic device 410 and the electronic device 430) connected to enable communication. For example, at least one of the electronic device 410 or the electronic device 430 may use the network protocol 455 to perform error control or data quality control, etc. Additionally or alternatively, the network protocol 455 may determine a transmission format of data transmitted/received between the electronic device 410 and the electronic device 430. Also, at least one of the electronic device 410 or the electronic device 430 may use the network protocol 455 to manage at least a session for mutual data exchange (e.g. session connection or session ending).

According to one example embodiment, the application protocol 457 may be a protocol for providing a flow or information for exchanging data related to a service provided to an external electronic device. For example, the electronic device 410 (e.g., the electronic device 101) may provide the service to the electronic device 430 (e.g., the electronic device 104 or the server 106) through the application protocol 457.

According to one example embodiment, the communication protocol 400 may include a communication protocol, a communication protocol designated by a person or organization (e.g., a communication protocol designated in a communication device manufacturing company, or a network supplying company, etc. itself), or a combination of them.

The term "module" used in the present disclosure may represent, for example, a unit including one of hardware, software, and firmware or a combination of them. The "module" may be, for example, used interchangeably with the terms "unit", "logic", "logical block", "component", or "circuit", etc. The "module" may be the minimum unit of an integrally implemented component or a part thereof. The "module" may be also the minimum unit performing one or more functions or a part thereof. The "module" may be implemented mechanically or electronically. For example, the "module" according to the present disclosure may include at least one of an Application-Specific Integrated Circuit (ASIC) chip, Field-Programmable Gate Arrays (FPGAs) or a programmable-logic device performing some operations known to the art or to be developed in the future.

According to various example embodiments, at least a part of an apparatus (e.g., modules or functions thereof) or method (e.g., operations) according to the present disclosure may be implemented by, for example, instructions stored in a computer-readable storage media in a form of a programming module. In case that the instruction is executed by one or more processors (e.g., the processor 120), the one or more processors may perform functions corresponding to the instructions. The computer-readable storage media may be the memory 130, for instance. At least a part of the programming module may be, for example, implemented (e.g., executed) by the processor 120. At least a part of the programming module may include, for example, a module, a program, a routine, sets of instructions, or a process, etc. for performing one or more functions.

The computer-readable recording medium may include a magnetic medium such as a hard disk, a floppy disk, and/or a magnetic tape, an optical medium such as a Compact Disc-Read Only Memory (CD-ROM) and a Digital Versatile Disc (DVD), a Magneto-Optical Medium such as a floptical disk, and a hardware device specially configured to store and perform a program instruction (e.g., the programming module) such as a Read Only Memory (ROM), a Random Access Memory (RAM), a flash memory, etc. Also, the program instruction may include not only a mechanical language code such as a code made by a compiler but also a high-level language code executable by a computer using an interpreter, etc. The aforementioned hardware device may be included to operate as one or more software modules in order to perform an operation of the present disclosure, and vice versa.

The module or the programming module according to various example embodiments of the present disclosure may further include at least one or more of the aforementioned constituent elements, or omit some of the aforementioned constituent elements, or further include additional other constituent elements. Operations carried out by the module, the programming module or the other constituent elements according to various example embodiments of the present disclosure may be executed in a sequential, parallel, repeated or heuristic method. Also, some operations may be executed in different order or may be omitted, or other operations may be added.

According to various example embodiments of the present disclosure, in a storage medium storing instructions, the instructions are set to enable at least one processor to perform at least one operation when being executed by the at least one processor. In an operation method of an electronic device, the at least one operation may include the operations of reading at least one information from a tag of an electronic pen of a counterpart electronic device, and executing a function associated with at least one information.

And, various example embodiments of the present disclosure disclosed in the present specification and drawings merely suggest specific examples so as to easily explain the technological content of the present disclosure and help the understanding of the present disclosure, and do not intend to limit the present disclosure. Accordingly, it should be understood that present disclosure includes all modifications or changes drawn on the basis of the present disclosure besides the example embodiments disclosed herein.

Figure 5:
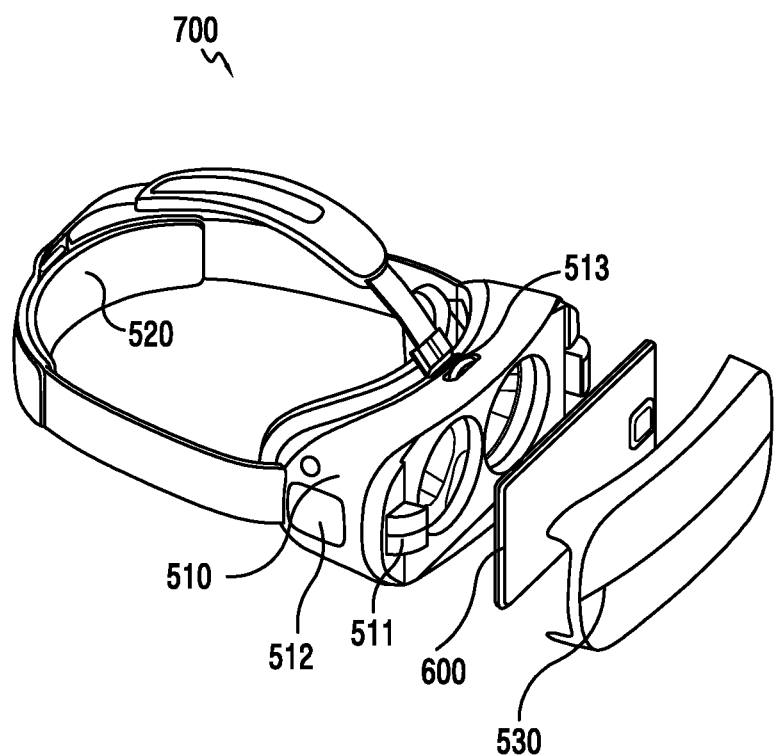
FIG. 5, FIG. 6 and FIG. 7 illustrate an implementation of a Head-Mounted Theater (HMT) according to one example embodiment of the present disclosure.
Figure 6:
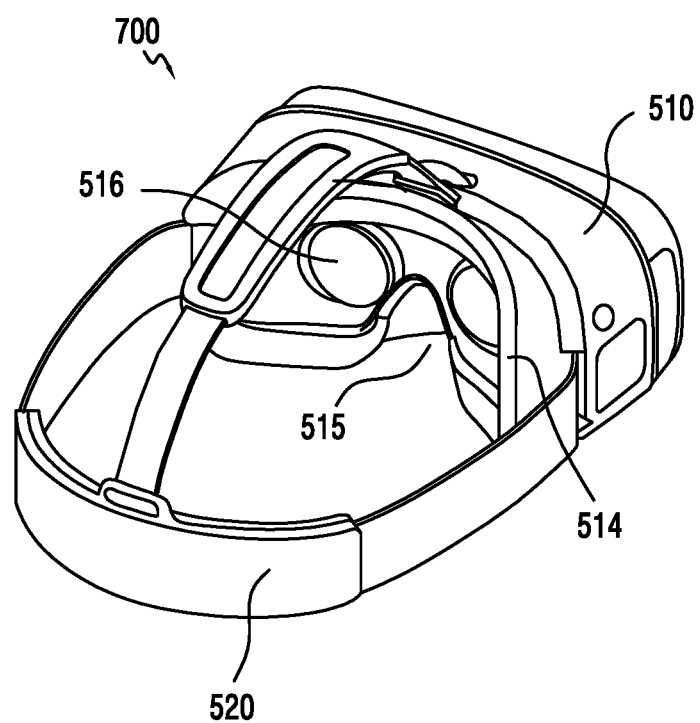
Figure 7:
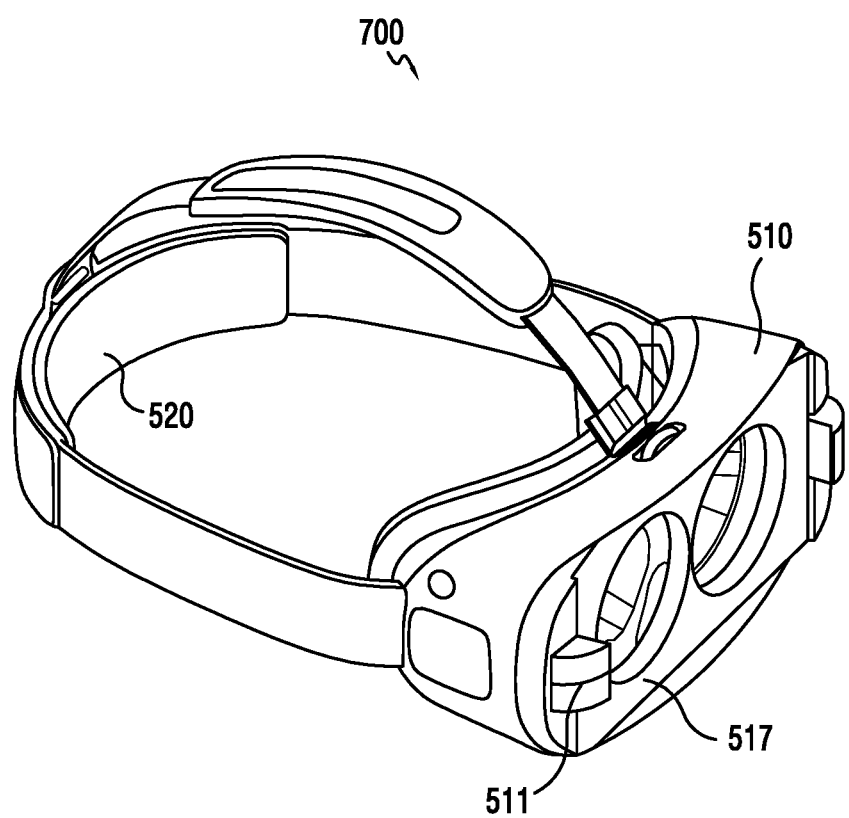

FIG. 5 to FIG. 7 illustrate an implementation of an HMT according to one example embodiment of the present disclosure. The HMT 700 illustrated in FIG. 5 may include a display device (for example, a smartphone 600), a main (or "primary") frame 510, a cover 530 configured to cover the terminal 600 and affix to the main frame 510, and a mounting part 520 configured to connect to the frame 510 and fix the HMT 700 to a portion of the human body. The terminal 600 may be configured to be attachable to and detachable from the frame 510.

The HMT 700 may be worn on a portion of the body of a user by using various mounting parts. For example, in one example embodiment, the mounting part 520 may include a band which is formed of elastic material such that the frame 510 may be position near and or at least partially around a user's eyes. In other example embodiments, the mounting part 520 may include other configurations or components, such as eyeglass temples, helmets or straps, etc.

The frame 510 may include a space or structure for accepting the terminal 600. Also, the frame 510 may further include a connector 511 communicatively coupled to an electrical connection part of the terminal 600, thus enabling communication with the terminal 600.

The frame 510 may include a touch panel 512 for user control and/or interface in one portion of an external part of the frame 510, for example. The touch panel 512 of the frame 510 may include one or more display position adjustment parts 513 or lens adjustment parts (not shown) on an external surface of the frame 510. In another example embodiment, the frame 510 may include different kinds of control devices for controlling the terminal 600 on a side surface of the frame 510. The control device may include at least one of a physical key, a physical button, a touch key, a joystick, a wheel key or a touch pad, etc., for example. The touch pad may display a Graphical User Interface (GUI) capable of controlling a function of the terminal, for example, a GUI controlling a sound or video.

In one example embodiment, the touch panel 512 may receive a user's touch input (i.e., a direct touch input or hovering input). As mentioned earlier, the terminal 600 and the frame 510 may connect with each other using an interface such as a USB, etc. and thus, a touch input the touch panel 512 receives may be transmitted to the terminal 600. In response to the touch input received by the touch panel 512, the terminal 600 may control a function corresponding to the touch input. For example, in response to the received touch input, the terminal 600 may adjust a sound volume or may control video playback.

Referring to FIG. 6, the main frame 510 may further include a "facial contact" part that is in contact with a user's face when the HMT 700 is worn by a user 514. The facial contact part 514 may have a structure corresponding to a curve of the user's facial surface, and may at least partially include an elastic body. A portion of the facial contact part 514 may include a nose recess 515 having a shape designed to correspond or accommodate a user's nose. A lens assembly including at least one lens 516 may be inserted into a part of the facial contact part 514 in a position corresponding or otherwise aligned with user's two eyes. At least one surface of the lens 516 may be exposed to the facial contact part 514 such that, when a user wears the HMT 700, the user may see a screen of the display device (e.g., the display 150) with user's eyes.

The frame 510 may include relatively lightweight materials (for example, plastic) for the sake of user's wearability. In another example embodiment, the frame 510 may include at least one of various other materials (for example, glass, ceramic, metal (e.g., aluminum) or metal alloy (e.g., iron, stainless steel, titanium or magnesium alloy)), for the sake of strength or beauty.

Referring to FIG. 7, one surface of the frame 510 may include a space or cavity 517 capable of accepting and/or securing the terminal 600. The part forming the space 517 of the frame 510 may include elastic materials. The part may include flexible materials such that it may modify a size of the space 517, and may accept terminals of various sizes.

Figure 8:
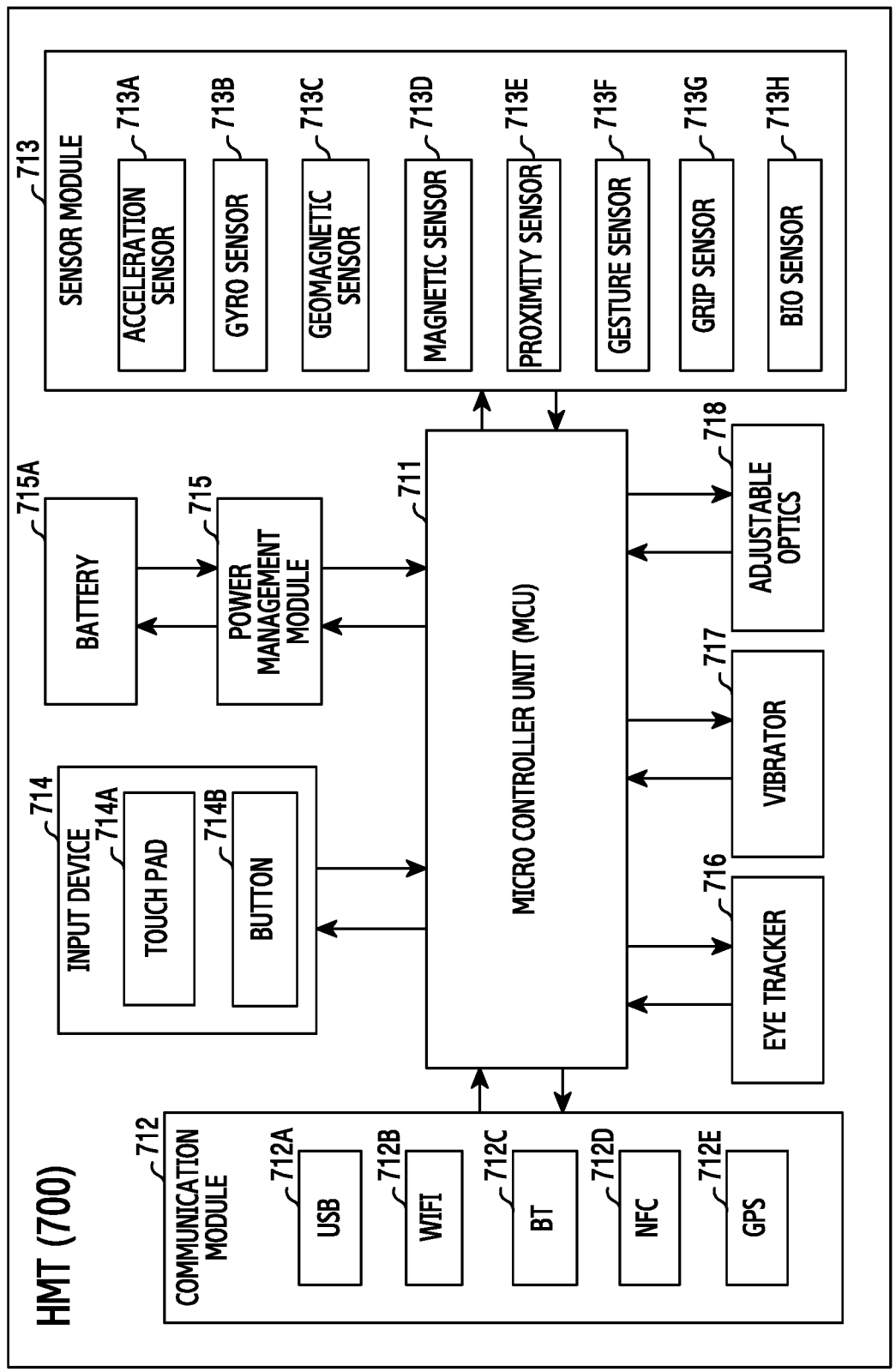
FIG. 8 is a schematic block diagram illustrating an HMT according to one example embodiment of the present disclosure.

FIG. 8 is a schematic block diagram illustrating an HMT according to one example embodiment of the present disclosure. The HMT 700 may mainly include a control unit or a controller (i.e., a Micro Controller Unit (MCU)) 711, a communication unit (i.e., a communication module) 712, a sensor unit (i.e., a sensor module) 713, an input unit (i.e., an input device) 714, a power device (i.e., a power management module) 715 managing a supply of power from a battery 715A, an eye tracker 716, a vibrator 717, and an adjustable optics (or lens assembly) 718. In the block diagram, other constituent elements (for example, a display) are not illustrated for the sake of description convenience. In another example embodiment, some of the constituent elements illustrated in the block diagram may be included within the main frame 510 of the HMT 700, and the other constituent elements may be included within the display device (for example, the detachable smartphone 600).

The "micro" control unit (MCU) 711 may include, for example, at least one computer processor, and may drive an Operating System (OS) or an embedded S/W program to control a plurality of hardware constituent elements connected to the control unit 711.

The communication unit 712 may use wired and/or wireless communication to electrically connect the frame 510 of the HMT 700 and the smartphone 600 and perform data transmission/reception between the HMT 700 and the smartphone 600. According to one example embodiment, the communication unit 712 may include a USB module 712A, a WiFi module 712B, a BT module 712C, an NFC module 712D, and a GPS module 712E. According to one example embodiment, at least some (e.g., two or more) of the WiFi module 712B, the BT module 712C, the NFC module 712D or the GPS module 712E may be included in one Integrated Chip (IC) or IC package.

The sensor unit 713 may meter a physical quantity or sense an activation state of the HMT 700 to convert metered or sensed information into an electrical signal. The sensor unit 713 may, for example, include at least one of an acceleration sensor 713A, a gyro sensor 713B, a geomagnetic sensor 713C, a magnetic sensor 713D, a proximity sensor 713E, a gesture sensor 713F, a grip sensor 713G, and a bio sensor 713H. The sensor unit 713 may use the acceleration sensor 713A, the gyro sensor 713B, and the geomagnetic sensor 713C to sense a head motion of a user who wears the HMT 700. The sensor unit 713 may use the proximity sensor 713E or the grip sensor 713G to sense the wearing or non-wearing of the HMT 700. In one example embodiment, at least some constituent elements of the sensor unit 713 may be included within the detachable smartphone 600.

According to one example embodiment, the sensor unit 713 may sense at least one of InfraRed (IR) recognition according to user's wearing, pressurization recognition, and capacitance (or permittivity) variation and sense user's wearing or non-wearing. The gesture sensor 713F may sense a user's hand or finger motion and receive the hand or finger motion as an input operation of the HMT 700. Additionally or alternatively, the sensor unit 713 may, for example, use the bio sensor 713H such as an E-nose sensor, an EMG sensor, an EEG sensor, an ECG sensor, an iris sensor, etc. to recognize bio information of a user. The sensor unit 713 may further include a control circuit for controlling at least one or more sensors belonging therein.

The input unit 714 may include a touch pad 714A and a button 714B. The touch pad 714A may recognize a touch input in at least one scheme among a capacitive overlay scheme, a pressure sensitive scheme, an infrared beam scheme, or an acoustic wave scheme. Also, the touch pad 714A may also further include a control circuit. In a case of the capacitive overlay scheme, physical contact or proximity detection is possible. The touch pad 714A may also further include a tactile layer. In this case, the touch pad 714A may provide a tactile response to the user. The button 714B may, for example, include a physical button, an optical key, or a keypad.

The eye tracker 716 may, for example, use at least one scheme of an Electrical Oculography (EOG) sensor, coil systems, dual purkinje systems, bright pupil systems, and dark pupil systems to track user's eyes. Also, the eye tracker 716 may also further include a micro camera for eye tracking.

The adjustable optics 718 may measure a distance between user's both eyes (i.e., an IPD (Inter-Pupil Distance) and adjust a distance between a lens and a position of a display (e.g., the panel 262) of the smartphone 600, such that the user may enjoy a video suitably to his/her own eyesight.

Figure 9:
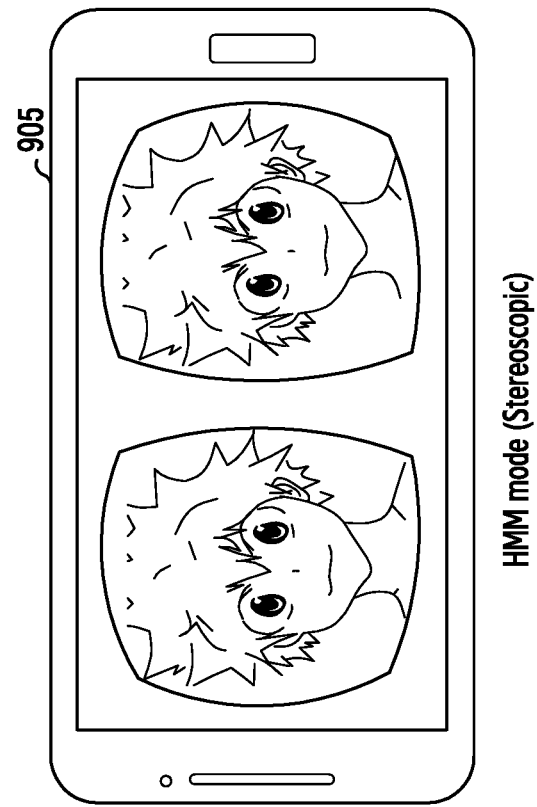
FIG. 9 is a diagram for explaining a normal mode (i.e., a monoscopic mode) and a Head-Mounted Mode (HMM) or Virtual Reality (VR) mode (or an HMT mode or stereoscopic mode) according to various example embodiments of the present disclosure.
Figure 9:

FIG. 9 is a diagram for explaining a normal mode (i.e., a monoscopic mode) 900 and a Head-Mounted Mode (HMM) or Virtual Reality (VR) mode (or an HMT mode or stereoscopic mode) 905 according to various example embodiments of the present disclosure. In case that a smartphone is operated with mounted on the frame of the HMT, the smartphone may convert from the normal mode 900 to the HMM or VR mode 905. In case that image data is 2Dimension (2D), the HMM or VR mode 905 may separate one image into two images and display the two images on the same display. In case that the image data is 3D, the HMM or VR mode 905 may also separate similar images (i.e., a left-eye image and a right-eye image) into two images and display the two images on the same display. According to one example embodiment, because a phenomenon occurs in which an image is distorted by the lens included in the frame of the HMT, the HMM or VR mode 905 may inversely distort a plane image according to a characteristic of the lens in order to provide a non-distorted image to a user.

Figure 10:
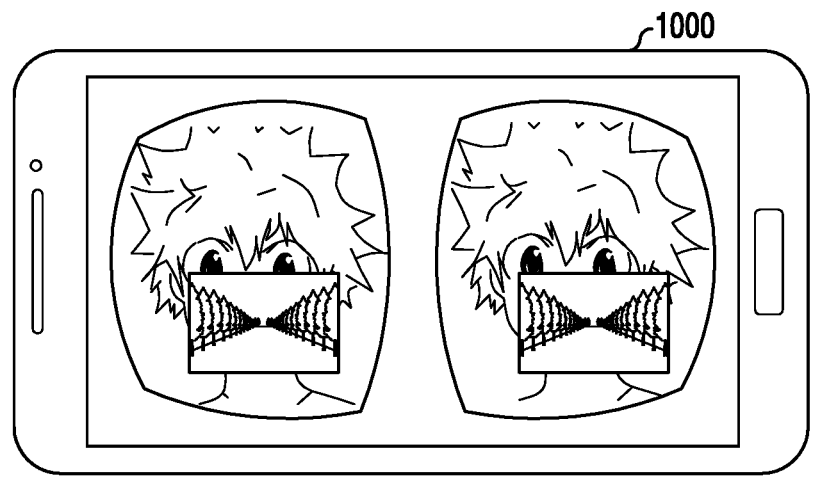
FIG. 10 is a diagram for explaining a see-through mode according to various example embodiments of the present disclosure.
Figure 10:
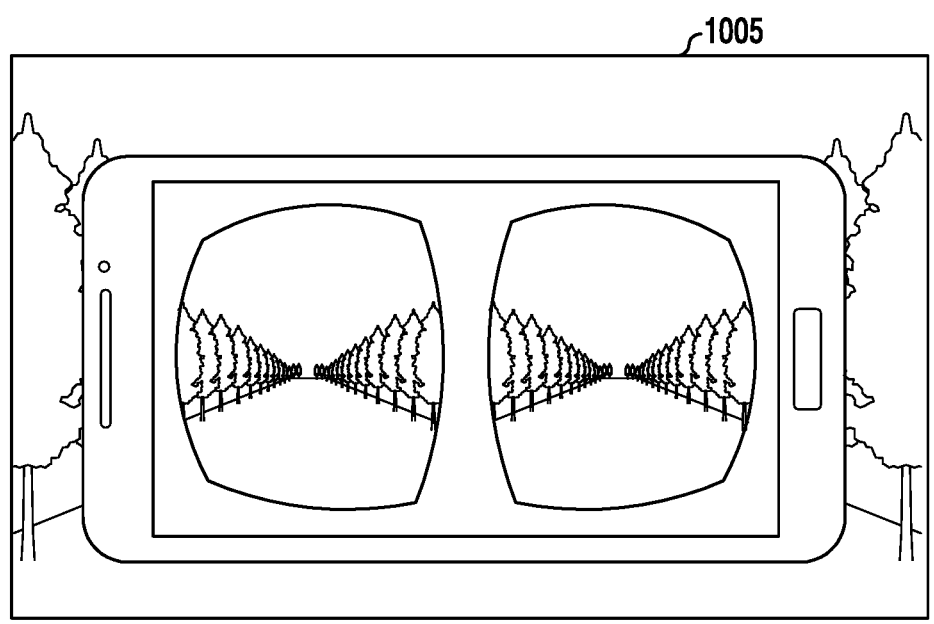

FIG. 10 is a diagram for explaining a see-through mode according to various example embodiments of the present disclosure. According to various example embodiments, the HMT may use a rear camera of a smartphone to provide the "see-through" mode 1005. In one example embodiment, a method of providing the see-through mode 1005 is described below. If a user presses a see-through mode conversion button in a VR mode, the rear camera of the smartphone may be enabled. At this time, a preview screen of the rear camera may be shown in a partial region of an existing VR screen in a Picture-In-Picture (PIP) form 1000, or the VR screen may convert into the background and the preview screen of the rear camera may be extended and shown throughout the whole region in see-through mode 1005. Through this, the user may experience an external virtual environment and concurrently, check a surrounding environment through a camera image according to need.

Figure 11:
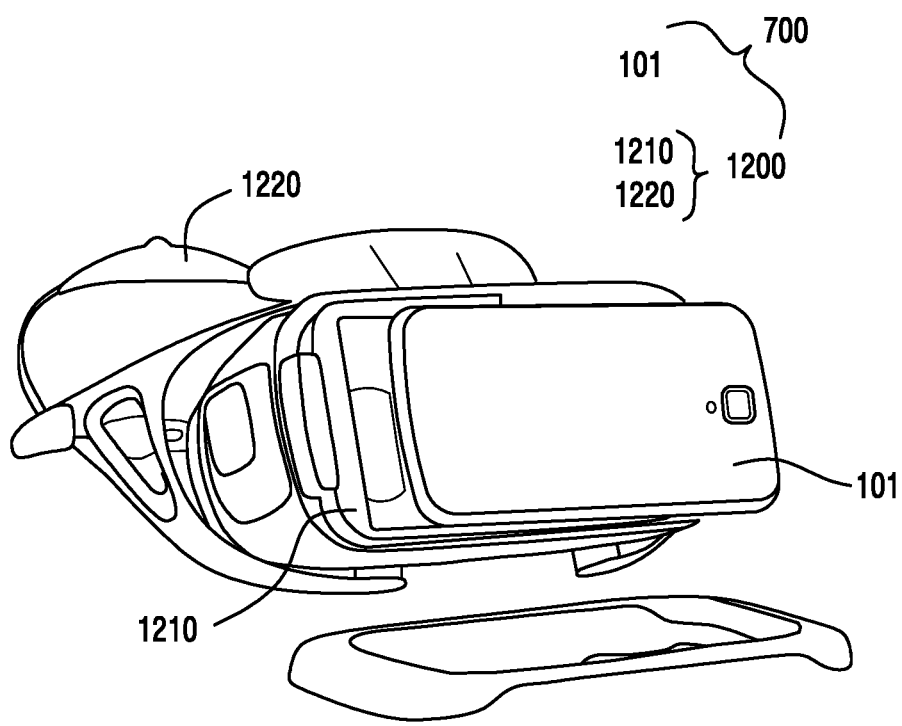
FIG. 11 illustrates a figure of mounting an electronic device on an HMD according to one example embodiment of the present disclosure.

FIG. 11 illustrates a figure of mounting an electronic device on an HMD according to one example embodiment of the present disclosure. And, FIG. 12 illustrates a state of wearing the HMD mounting the electronic device according to one example embodiment of the present disclosure.

Figure 12:
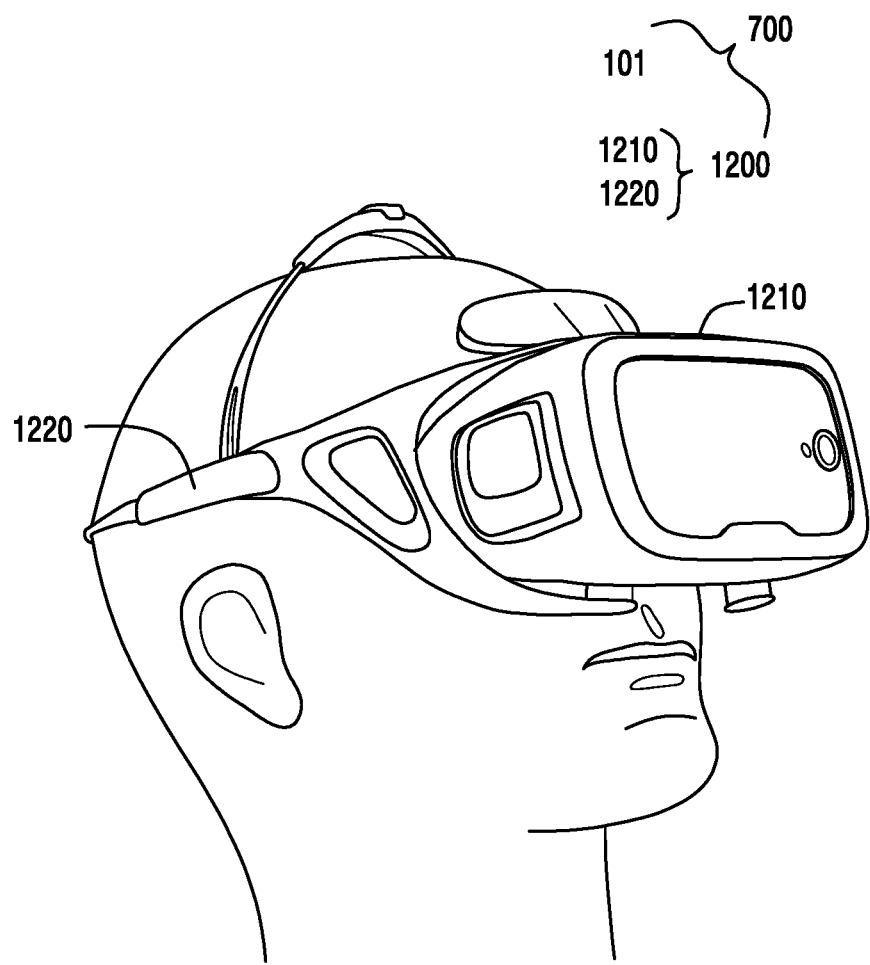
FIG. 12 illustrates a state of wearing an HMD mounting an electronic device according to one example embodiment of the present disclosure.

Referring to FIG. 11 and FIG. 12, the HMD 1200 according to one example embodiment may include a main frame 1210 and a mounting part 1220. The main frame 1210 may be a part in which the electronic device 101 is attachable and detachable. The mounting part 1220 (e.g., band) may fix the main frame 1210 to a user's head.

According to various example embodiments, the HMD 1200 may further include a user interface selectively.

In one example embodiment, a lens assembly (not shown) may be included between the display 150 of the electronic device 101 and user's eyes. The HMD 1200 may include a connector capable of connecting to an electrical connection part (for example, a USB port) of the electronic device 101, and may provide a signal of a user interface to the electronic device 101 through the connector-electrical connection part. Below, two devices (i.e., the electronic device 101 and the HMD 1200) may be called a 'Head-Mounted Theater (HMT)' 700 in a mutually connected state.

According to one example embodiment, the HMT 700 may provide at least one of a see-through function of providing Augmented Reality (AR) or a see-closed function of providing Virtual Reality (VR), for example.

According to one example embodiment, the see-through function may mean a function of forwarding real external object(s) to user's eyes through the display 150 of the electronic device 101 or a transparent/semi-transparent lens, while providing an object or a virtual target or object to a user visually or using various sensible means. The see-through function may provide additional information and images about an object which is actually seen, etc. to the user.

According to one example embodiment, the see-closed function may be provided by the display 150 of the electronic device 101. For example, the HMT 700 may be arranged before the user's eyes and be configured to allow the user to see contents (e.g., a game, a movie, streaming, broadcasting, etc.) provided through the display 150 of the electronic device 101. The see-closed function may use an independent screen to provide a sense of immersion to the user.

According to one example embodiment, the electronic device 101 (e.g., smartphone) may set a picture quality suitable to a user environment. The HMT 700 may provide an independent display environment fully separated from an external light source (i.e., similar to a dark room) unlike a general user environment.

According to various example embodiments of the present disclosure, the electronic device 101 may execute various operations for enhancing a picture quality or reducing the degradation of the aforementioned picture quality in an HMT mode. Below, the HMT mode may indicate an HMT 700 state. Or, the HMT mode may be, though not the HMT 700 state, a mode arbitrarily executed by a user's input or a mode operating in a stereoscopic fashion.

Figure 13:
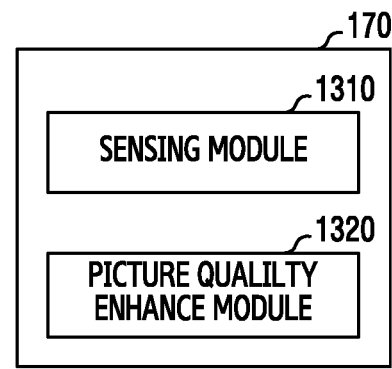
FIG. 13 is a block diagram illustrating an HMT module according to various example embodiments of the present disclosure.

FIG. 13 is a block diagram illustrating an HMT module according to various example embodiments of the present disclosure.

Referring to FIG. 13, the HMT module 170 may include a sensing module 1310 and a picture quality enhance module 1320.

According to one example embodiment, the sensing module 1310 may sense setting of an adaptive screen of an HMT mode. The setting of the adaptive screen of the HMT mode may include at least one of sensing conversion into the HMT mode, sensing interworking with the HMD 1200, sensing a request of a picture quality enhance function from a user in the HMT mode, or sensing user's wearing of the HMT 700.

According to one example embodiment, the sensing module 1310 may sense the setting of the adaptive screen of the HMT mode, if it is a stereoscopic mode (i.e., a mode in which a similar or same image is separated and displayed for both eyes).

According to another example embodiment, in case that the HMD 1200 is worn on the electronic device 101, the sensing module 1310 may recognize the setting of the adaptive screen of the HMT mode. For example, the electronic device 101 and/or HMD 1200 may include various sensors such as an acceleration sensor, a bio sensor, a proximity sensor, or a capacitive sensor, etc. The sensing module 1310 may recognize the setting of the adaptive screen of the HMT mode, on the basis of at least a part of information acquired from a sensor of the electronic device 101 and/or HMD 1200.

According to another example embodiment, the sensing module 1310 may sense the setting of the adaptive screen of the HMT mode in accordance with a user's manual input. For example, the electronic device 101 and/or HMD 1200 may include one or more buttons among a software button (e.g., a button provided through a touch screen) or a physical hardware button, etc. The sensing module 1310 may recognize the setting of the adaptive screen of the HMT mode on the basis of at least a part of an input generated using one or more buttons of the electronic device 101 and/or HMD 1200.

According to a further example embodiment, the sensing module 1310 may sense the setting of the adaptive screen of the HMT mode by user's selective input in a menu provided in a state in which the HMD 1200 is mounted on the electronic device 101.

According to a yet another example embodiment, the sensing module 1310 may sense the setting of the adaptive screen of the HMT mode, if there is a wired or wireless functional connection between the electronic device 101 and the HMD 1200.

According to one example embodiment, the picture quality enhance module 1320 may control a display according to the setting of the adaptive screen of the HMT mode. The HMT mode may include a mode of interworking with the HMD 1200 or a mode in which a similar or same image is displayed left and right.

According to one example embodiment, the picture quality enhance module 1320 may express a black color during a partial time of a unit image frame in the HMT mode, for example.

According to another example embodiment, the picture quality enhance module 1320 may increase the number of drive clocks of an OLED panel circuit in the HMT mode, in a display device including an OLED screen.

According to a further example embodiment, the picture quality enhance module 1320 may check image data of a black color in the HMT mode, and display the image data of the black color in a color brighter than the black color in the HMT mode.

According to a yet another example embodiment, the picture quality enhance module 1320 may correct a color of a screen in the HMT mode.

According to various example embodiments, the HMT module 170 may be configured to be included in the processor 120.

According to one example embodiment of the present disclosure, a display device may include a screen, and a control unit for controlling the screen. The control unit may sense setting of an adaptive screen of an HMT mode, and express a black color during a partial time of a unit image frame in the HMT mode.

According to one example embodiment of the present disclosure, the HMT mode may include a mode of interworking with an HMD or a mode in which the same image is displayed left and right.

According to one example embodiment of the present disclosure, the setting of the adaptive screen of the HMT mode may be based on a stereoscopic mode.

According to one example embodiment of the present disclosure, the setting of the adaptive screen of the HMT mode may be based on the wearing or non-wearing of an HMD.

According to one example embodiment of the present disclosure, the setting of the adaptive screen of the HMT mode may be based on a user's manual input.

According to one example embodiment of the present disclosure, the setting of the adaptive screen of the HMT mode may be based on a wired or wireless functional connection between the display device and an HMD.

According to one example embodiment of the present disclosure, the setting of the adaptive screen of the HMT mode by the display device may include at least one of sensing conversion into the HMT mode, sensing interworking with an HMD, sensing a request of a picture quality enhancement function from a user in the HMT mode, and sensing user's wearing of the HMD.

According to one example embodiment of the present disclosure, the control unit may adjust a time duration expressing the black color, in accordance with at least one of a user's input, an executed application, and motion information of the display device.

According to one example embodiment of the present disclosure, the control unit may express the black color in a scheme of inserting a black image at the partial time of the unit image frame.

According to one example embodiment of the present disclosure, the control unit may express the black color in a scheme of disabling the screen during the partial time of the unit image frame.

According to one example embodiment of the present disclosure, the control unit may use an AID scheme to express the black color during the partial time of the unit image frame in the HMT mode.

According to another example embodiment of the present disclosure, a display device may include an OLED screen, and a control unit for controlling the OLED screen. The control unit may sense setting of an adaptive screen of an HMT mode, and increase the number of drive clocks of an OLED panel circuit in the HMT mode.

According to another example embodiment of the present disclosure, the HMT mode may include a mode of interworking with an HMD or a mode in which the same image is displayed left and right.

According to another example embodiment of the present disclosure, the setting of the adaptive screen of the HMT mode may be based on a stereoscopic mode.

According to another example embodiment of the present disclosure, the setting of the adaptive screen of the HMT mode may be based on the wearing or non-wearing of an HMD.

According to another example embodiment of the present disclosure, the setting of the adaptive screen of the HMT mode may be based on a user's manual input.

According to another example embodiment of the present disclosure, the setting of the adaptive screen of the HMT mode may be based on a wired or wireless functional connection between the display device and an HMD.

According to another example embodiment of the present disclosure, the control unit may set the number of drive clocks of the OLED panel circuit based on at least one of a user's input, an executed application, and motion information of the display device.

According to a further example embodiment of the present disclosure, a display device may include a screen, and a control unit for controlling the screen. The control unit may sense setting of an adaptive screen of an HMT mode, and check image data of a black color in the HMT mode, and display the image data of the black color in a color brighter than the black color in the HMT mode.

According to a further example embodiment of the present disclosure, the HMT mode may include a mode of interworking with an HMD or a mode in which the same image is displayed left and right.

According to a further example embodiment of the present disclosure, the setting of the adaptive screen of the HMT mode may be based on a stereoscopic mode.

According to a further example embodiment of the present disclosure, the setting of the adaptive screen of the HMT mode may be based on the wearing or non-wearing of an HMD.

According to a further example embodiment of the present disclosure, the setting of the adaptive screen of the HMT mode may be based on a user's manual input.

According to a further example embodiment of the present disclosure, the setting of the adaptive screen of the HMT mode may be based on a wired or wireless functional connection between the display device and an HMD.

According to a further example embodiment of the present disclosure, the control unit may determine a color replacing a black color based on at least one of a user's input, an executed application, and motion information of the display device.

According to a further example embodiment of the present disclosure, the color brighter than the black color may include a gray color.

According to various example embodiments of the present disclosure, a display device may include a screen, and a control unit for controlling the screen. The control unit may sense setting of an adaptive screen of an HMT mode, and correct a color of the screen in the HMT mode.

According to various example embodiments of the present disclosure, the HMT mode may include a mode of interworking with an HMD or a mode in which the same image is displayed left and right.

According to various example embodiments of the present disclosure, the setting of the adaptive screen of the HMT mode may be based on a stereoscopic mode.

According to various example embodiments of the present disclosure, the setting of the adaptive screen of the HMT mode may be based on the wearing or non-wearing of an HMD.

According to various example embodiments of the present disclosure, the setting of the adaptive screen of the HMT mode may be based on a user's manual input.

According to various example embodiments of the present disclosure, the setting of the adaptive screen of the HMT mode may be based on a wired or wireless functional connection between the display device and an HMD.

According to various example embodiments of the present disclosure, the control unit may correct a color of the screen in a scheme of displaying the color of the screen at a previously designated color temperature.

According to various example embodiments of the present disclosure, the control unit may correct the color of the screen in a scheme of not displaying a color of a specific wavelength.

According to various example embodiments of the present disclosure, the control unit may correct the color of the screen in a scheme of setting a brightness of the color of the screen to a lower brightness than before entering the HMT mode.

According to various example embodiments of the present disclosure, a display device comprises a controller configured to activate a Head Mounted Theater (HMT) mode, the HMT mode displaying two images which are substantially same each other on first and second areas respectively, separated from each other, in a display area of the display device, and adjust a display time, for displaying a black screen in the first and second areas, of a unit frame time when the HMT mode is activated.

According to various example embodiments of the present disclosure, the black screen is provided by disabling the first and second areas.

According to various example embodiments of the present disclosure, the display device includes an Active-Matrix Organic Light-Emitting Diode (AMOLED), and the adjusting the display time for displaying the black screen is provided by adjusting a percentage of inactivating the AMOLED.

According to various example embodiments of the present disclosure, the black screen is provided by displaying a black image.

According to various example embodiments of the present disclosure, the controller is configured to activate the HMT mode when the display device is communicatively coupled to a Head-Mounted Device (HMD).

According to various example embodiments of the present disclosure, the controller is configured to activate the HMT mode when detecting that the display device is worn by a user.

According to various example embodiments of the present disclosure, the controller is configured to activate the HMT mode in response to detection of a user input.

According to various example embodiments of the present disclosure, the controller is configured to detect a movement of the display device, and adjust a period of the black screen based on the detected movement.

According to various example embodiments of the present disclosure, the controller is configured to detect an execution of an application in associated with the image, and adjust a period of the black screen based on the application.

According to various example embodiments of the present disclosure, a display device comprises an Organic Light Emitting Diode (OLED), an Organic Light Emitting Diode (OLED) circuit for driving the OLED, and a controller configured to activate a Head Mounted Theater (HMT) mode, the HMT mode display an image on first and second area, separated from each other, in a display area of the display device, and increase a driving clock speed of the OLED circuit in the HMT mode.

According to various example embodiments of the present disclosure, the controller is configured to activate the HMT mode when the display device is communicatively coupled to a Head-Mounted Device (HMD).

According to various example embodiments of the present disclosure, the controller is configured to activate the HMT mode when detecting that the display device is worn by a user.

According to various example embodiments of the present disclosure, the controller is configured to activate the HMT mode in response to detection of a user input.

According to various example embodiments of the present disclosure, the controller is configured to detect a movement of the display device, and adjust the clock speed of the OLED circuit based on the detected movement.

According to various example embodiments of the present disclosure, the controller is configured to detect an execution of an application in associated with the image, and adjust the clock speed of the OLED circuit based on the application.

Figure 14:
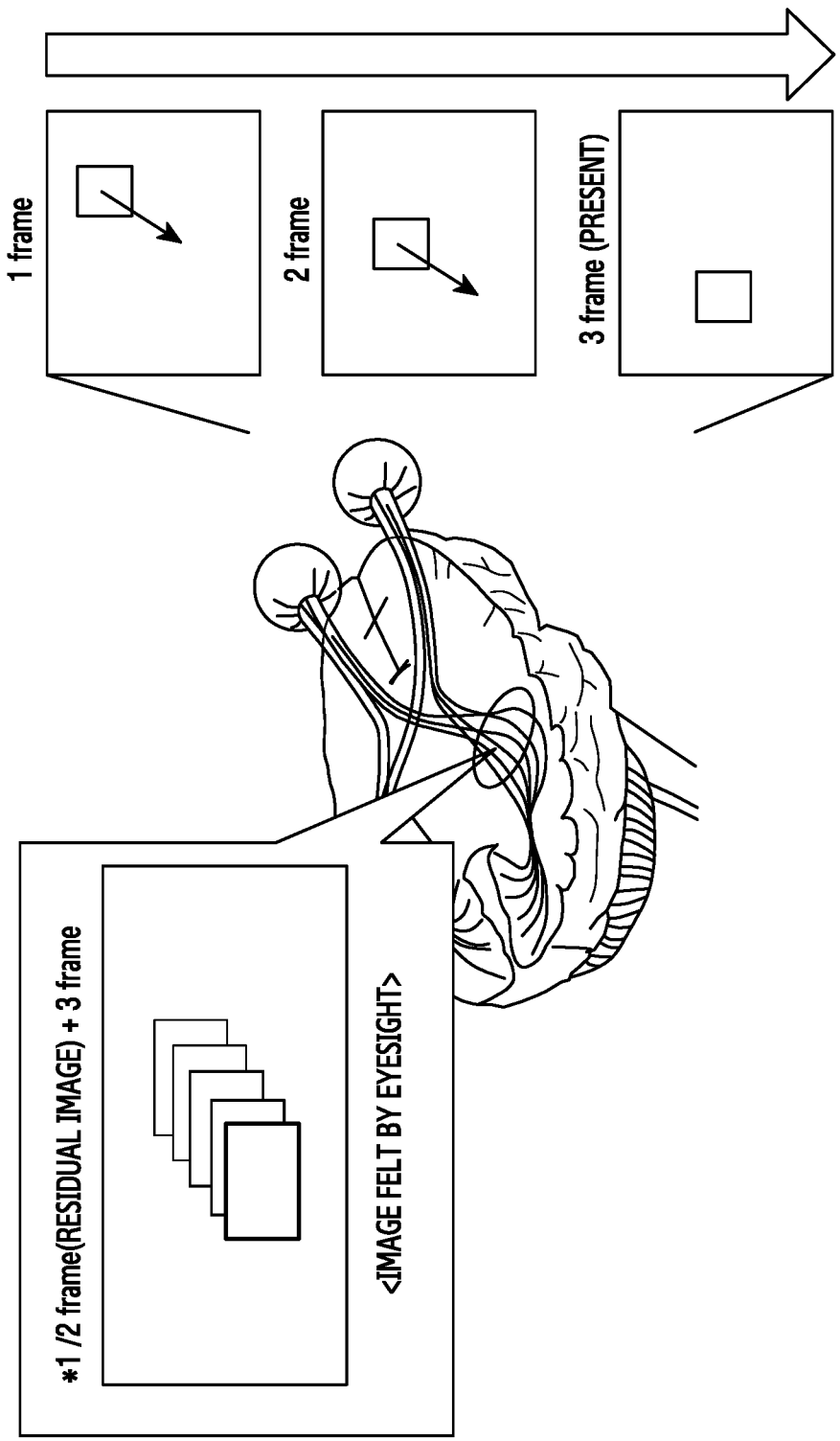
FIG. 14 is a diagram for explaining motion blur.

FIG. 14 is a diagram for explaining a motion blur effect.

Referring to FIG. 14, the motion blur may be defined as a phenomenon in which a screen may appear "crushed," created by a difference between discontinuous image expression sand continuous eye recognition in a screen in which one or more objects are depicted as fast-moving. For example, the display 150 expresses a discontinuous image because of physical limitation, but the motion blur may occur because human eyes recognize a continuous image temporally and spatially.

To improve the motion blur, there may be a method of increasing a frame rate of the display 150. However, it may be difficult to increase the frame rate as much as desired because of the limitation of the performance of the processor (e.g., Application Processor or "AP") of the electronic device 101 and the display 150. Or, to improve the motion blur, there may be a method of satisfying the performance of the electronic device 101 while increasing a time difference between frames. However, it may be difficult to adjust the time difference between the frames because the display 150 displays a fixed frequency image.

Figure 15:
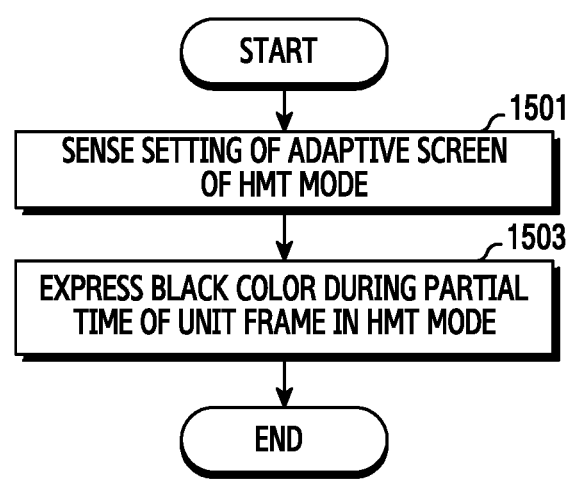
FIG. 15 illustrates an operation flow for improving motion blur in an HMT mode according to one example embodiment of the present disclosure.

FIG. 15 illustrates an operation flow for improving motion blur in an HMT mode according to one example embodiment of the present disclosure.

Referring to FIG. 15, in operation 1501, the HMT module 170 (e.g., the sensing module 1310 of FIG. 13) may sense setting of an adaptive screen of an HMT mode.

According to one example embodiment, the HMT module 170 may sense the setting of the adaptive screen of the HMT mode, if it is a stereoscopic mode (i.e., a mode in which a similar or same image is separated and displayed for both eyes).

According to another example embodiment, if the HMD 1200 is worn on the electronic device 101, the HMT module 170 may recognize the setting of the adaptive screen of the HMT mode.

According to a further example embodiment, the HMT module 170 may sense the setting of the adaptive screen of the HMT mode according to a user's manual input.

According to a yet another example embodiment, the HMT module 170 may sense the setting of the adaptive screen of the HMT mode by user's selective input in a menu provided in a state in which the HMD 1200 is mounted on the electronic device 101.

According to a still another example embodiment, the HMT module 170 may sense the setting of the adaptive screen of the HMT mode, if there is a wired or wireless functional connection between the electronic device 101 and the HMD 1200.

In operation 1503, the HMT module 170 (e.g., the picture quality enhance module 1320) may express a black color during a partial time of a unit frame in the HMT mode.

According to one example embodiment, in the HMT mode, the HMT module 170 may be configured to display a black color during a partial or portion time for a particular unit frame, and display image during a remainder time portion of the unit frame. The insertion of the black color may improve the aforementioned motion blur by enabling a user to clearly recognize an image of each of unit frames of sequential relation.

Figure 16:
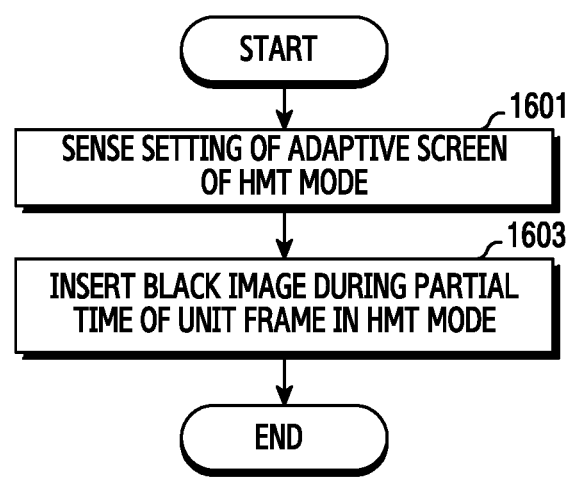
FIG. 16 illustrates an operation flow for improving motion blur in an HMT mode according to various example embodiments of the present disclosure.

FIG. 16 illustrates an operation flow for improving motion blur in an HMT mode according to various example embodiments of the present disclosure. And, FIG. 17 schematically illustrates inserting a black image into a unit frame in an HMT mode in accordance with various example embodiments of the present disclosure.

Figure 17:
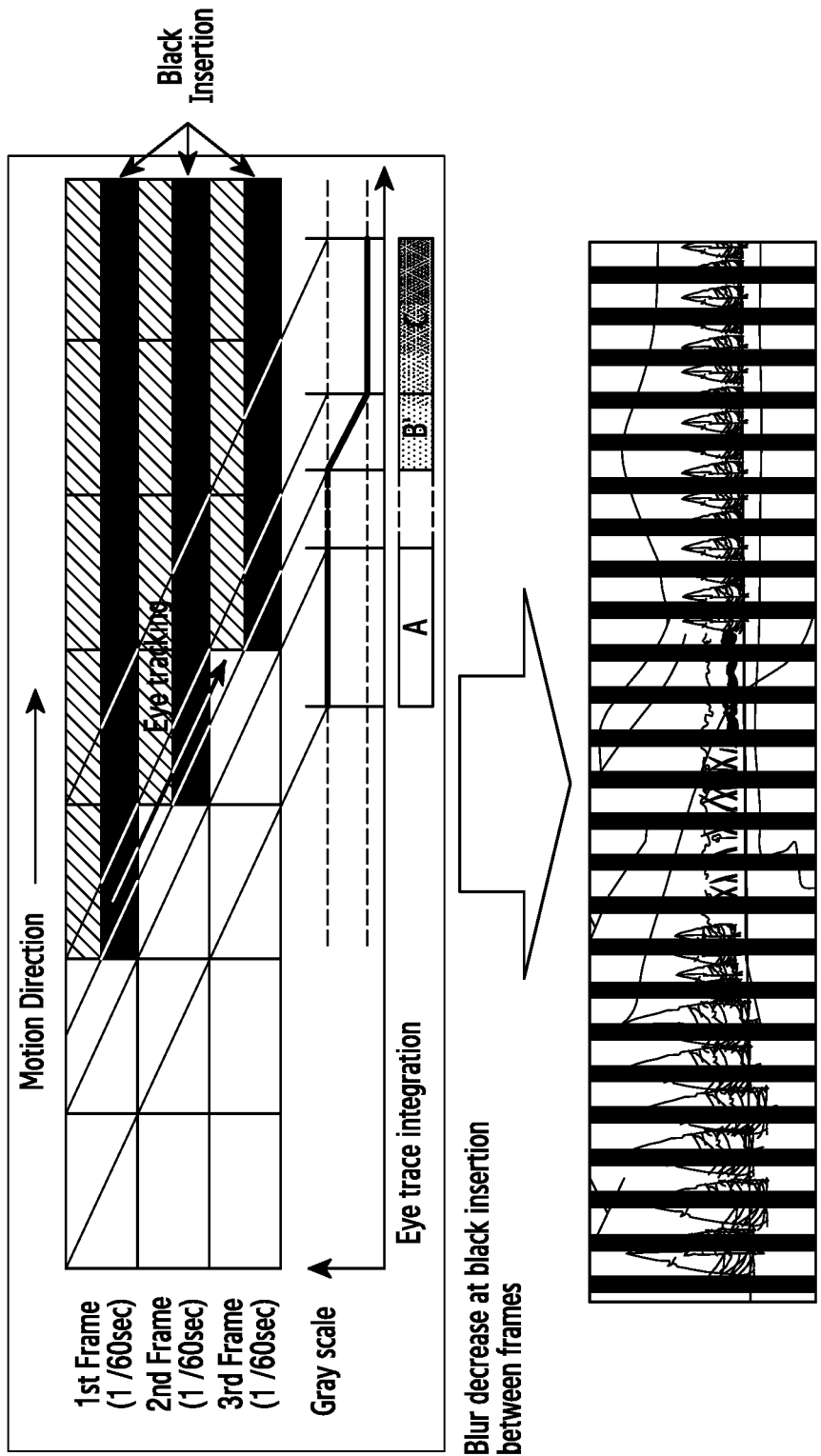
FIG. 17 schematically illustrates inserting a black image into a unit frame in an HMT mode in accordance with various example embodiments of the present disclosure.

Referring to FIG. 16 and FIG. 17, in operation 1601, the HMT module 170 (e.g., the sensing module 1310) may sense setting of an adaptive screen of an HMT mode. For example, the HMT module 170 may sense the setting of the adaptive screen of the HMT mode, if it is a stereoscopic mode (i.e., a mode in which a similar or same image is separated and displayed for both eyes). For another example, if the HMD 1200 is worn on the electronic device 101, the HMT module 170 may recognize the setting of the adaptive screen of the HMT mode. For further example, the HMT module 170 may sense the setting of the adaptive screen of the HMT mode according to a user's manual input. For yet another example, the HMT module 170 may sense the setting of the adaptive screen of the HMT mode by user's selective input in a menu provided in a state in which the HMD 1200 is mounted on the electronic device 101. For still another example, the HMT module 170 may sense the setting of the adaptive screen of the HMT mode, if there is a wired or wireless functional connection between the electronic device 101 and the HMD 1200.

In operation 1603, the HMT module 170 (e.g., the picture quality enhance module 1320) may insert a black image during a partial time of a unit frame.

According to one example embodiment, while the HMT module 170 applies a frame rate (e.g., 60 frames per one second) to display a plurality of frames on a screen (e.g., an OLED screen or LCD screen), each unit frame may display a black image during a partial time of the whole time for each of the plurality of frames, and display a graphic image during a remaining time for each of the plurality of frames. The graphic image, which is an image for a user interface, may be associated with a photo, a video, a text, etc.

According to one example embodiment, the insertion of the black color may improve the aforementioned motion blur by enabling a user to clearly recognize an image of each of unit frames of sequential relation. Or, although user eyes are tracked during a frame playback, the insertion of the black image may improve the motion blur.

According to one example embodiment, the whole time of the unit frame may be set as 1/60 second, and a time displaying the black image may be set as 1/30 second.

According to various example embodiments, the HMT module 170 may also adjust a time displaying the black image in the unit frame. For example, the HMT module 170 may adjust the time displaying the black image in the unit frame on the basis of at least a part of input(s) generated from the electronic device 101 and/or HMD 1200.

For example, the electronic device 101 and/or HMD 1200 may include a gesture sensor, a gyro sensor, an air pressure sensor, a magnetic sensor, an acceleration sensor, a grip sensor, a proximity sensor, an RGB sensor, a bio sensor, a temperature/humidity sensor, an illumination sensor, or a UV sensor, etc. The HMT module 170 may adjust the time displaying the black image in the unit frame, on the basis of at least a part of information acquired from the sensors of the electronic device 101 and/or HMD 1200.

For another example, the HMT module 170 may adjust the time displaying the black image in the unit frame according to a user's manual input. According to one example embodiment, the HMT module 170 may adjust the time displaying the black image in the unit frame by a user's selective input in a menu provided in a state in which the HMD 1200 is mounted on the electronic device 101. For example, because an image recognition rate is different every user, the aforementioned user's manual input scheme may be helpful for user-customized picture quality enhancement.

Figure 18:
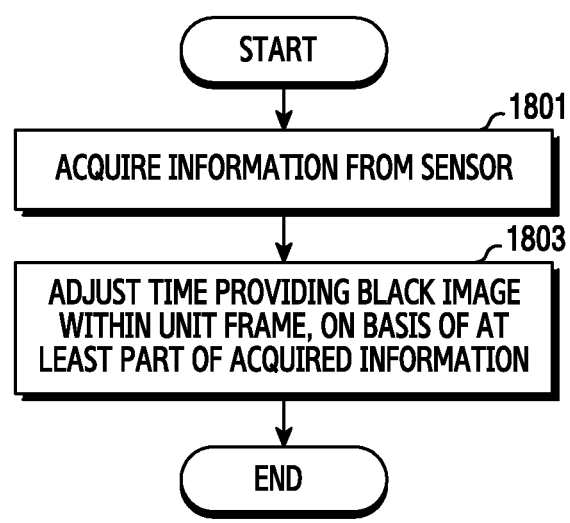
FIG. 18 illustrates a flow of inserting a black image in a unit frame in an HMT mode according to various example embodiments of the present disclosure.

FIG. 18 illustrates a flow of inserting a black image in a unit frame in an HMT mode according to various example embodiments of the present disclosure. And, FIG. 19 and FIG. 20 are reference tables for explaining the flow of FIG. 18.

Referring to FIG. 18 and FIG. 19, in operation 1801, the HMT module 170 (e.g., the picture quality enhance module 1320) may acquire information from a sensor. For example, the electronic device 101 and/or HMD 1200 may include a gesture sensor, a gyro sensor, an air pressure sensor, a magnetic sensor, an acceleration sensor, a grip sensor, a proximity sensor, an RGB sensor, a bio sensor, a temperature/humidity sensor, an illumination sensor, or a UV sensor, etc. The HMT module 170 may collect information from the aforementioned at least one or more sensors of the electronic device 101 and/or HMD 1200.

In operation 1803, the HMT module 170 may adjust the time of each frame for which the black image is displayed, provided and/or inserted in the unit frame, on the basis of at least a part of the information acquired from the at least one or more sensors.

Referring to FIG. 19 according to one example embodiment, the HMT module 170 may check condition information from the information acquired from the at least one or more sensors. The HMT module 170 may set a black image provision time within a unit frame on the basis of the checked condition information. The condition information may be various according to the type of the sensor (e.g., the condition information '1', '2', '3' or '4', etc.). The condition information may be various according to a combination of a plurality of sensor (e.g., the condition information '1 and 2', '1 and 3', etc.). For example, the HMT module 170 may adjust the black image provision time within the unit frame, on the basis of the condition information '1' dependent on information about rotation measured from the acceleration sensor and the condition information '2' dependent on information measured from the RGB sensor.

Referring to FIG. 20 according to another example embodiment, the HMT module 170 may also set a black image provision time within a unit frame, on the basis of a size of a value (X) acquired from a sensor (below, referred to as a 'sensor value').

According to various example embodiments, a reference table of FIG. 19 or FIG. 20 may be implemented in consideration of common user's eye recognition. According to cases, the reference table may be adjusted on a per-user basis.

According to various example embodiments, the reference table of FIG. 19 or FIG. 20 may be mounted in a memory of the electronic device 101. Or, the reference table of FIG. 19 or FIG. 20 may be also provided from an external device to the electronic device 101.

Figure 21:
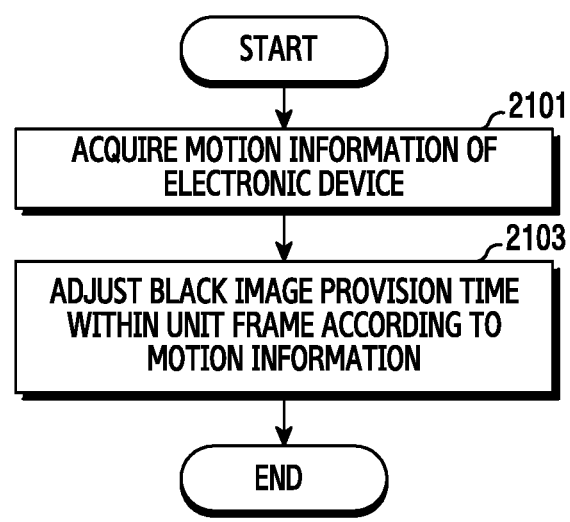
FIG. 21 illustrates a flow of inserting a black image in a unit frame in an HMT mode according to various example embodiments of the present disclosure.

FIG. 21 illustrates a flow of inserting a black image in a unit frame in an HMT mode according to various example embodiments of the present disclosure. And, FIG. 22 is an example diagram for explaining the flow of FIG. 21.

Referring to FIG. 21, in operation 2101, the HMT module 170 (e.g., the picture quality enhance module 1320) may acquire motion information of the electronic device 101 (or a display device). For example, the HMT module 170 may obtain information about a motion of the electronic device 101 from at least one sensor (e.g., an acceleration sensor, a gyro sensor, a gravity sensor, etc.) of the electronic device 101 or HMD 1200.

In operation 2103, the HMT module 170 (e.g., the picture quality enhance module 1320) may adjust a time duration displaying a black color (e.g., inserting a black image) within a unit frame in accordance with the acquired motion information of the electronic device 101.

Figure 22:
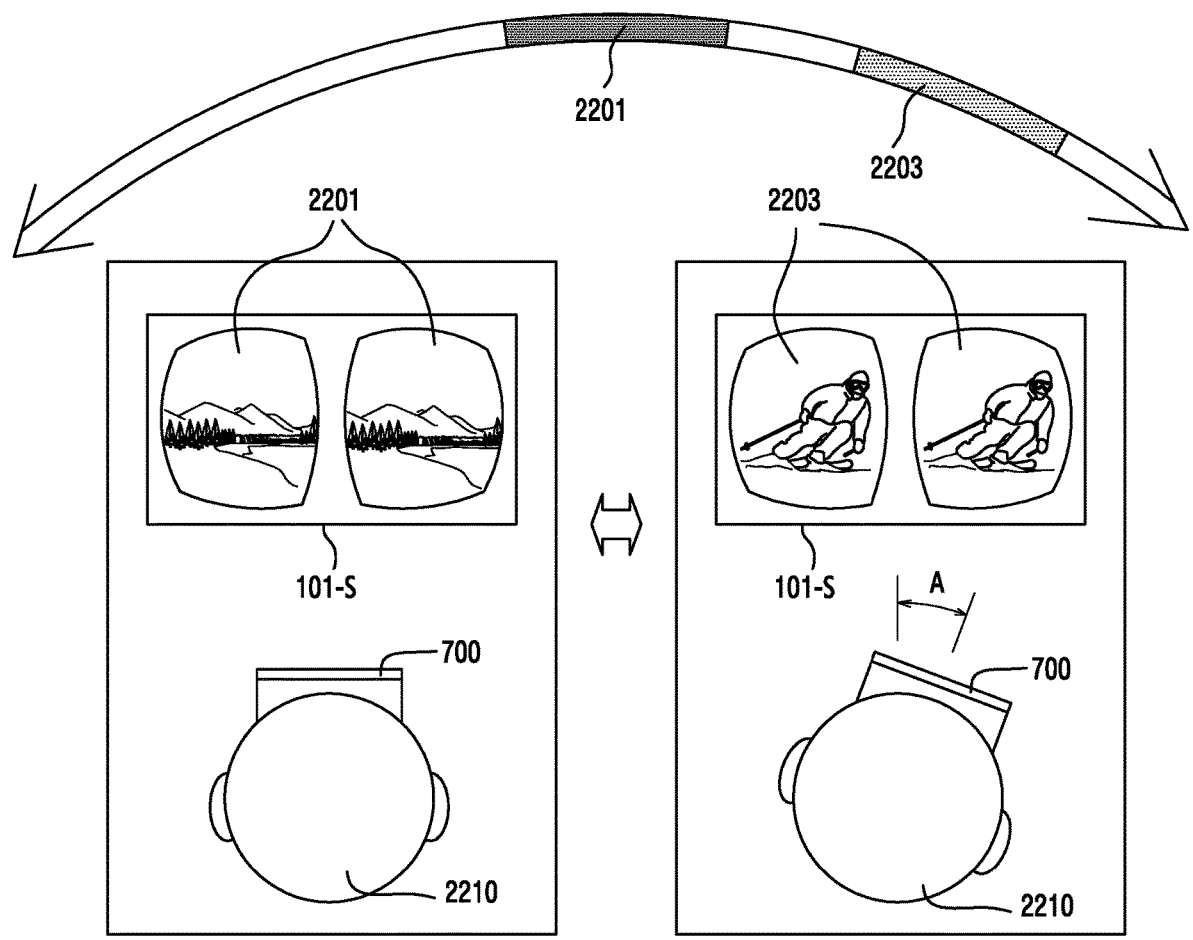
FIG. 22 is an example diagram for explaining the flow of FIG. 21.

According to one example embodiment, referring to FIG. 22, in a state in which the HMT 700 is mounted on a user's head 2210, if the user's head 2210 is rotated, the HMT 700 may be also rotated along the rotating user's head 2210. In response to the rotation, the HMT 700 may change an image provided through a screen (for example, a screen 101-S of the electronic device 101) from a first image 2201 to a second image 2203. At least one sensor mounted on the electronic device 101 of the HMT 700 and/or the HMD 1200 thereof may measure a rotation angle of the HMT 700. The HMT 700 may provide an image corresponding to the rotation angle measured from the at least one sensor. For example, the image provided through the screen 101-S of the HMT 700 may be an image stored in a memory of the electronic device 101. Or, the image provided through the screen 101-S of the HMT 700 may be an image captured through a camera installed in the electronic device 101 and/or HMD 1200. For example, if the image of the screen 101-S is changed from the first image 2201 to the second image 2203 according to the rotation of the HMT 700, the aforementioned motion blur may be induced.

According to one example embodiment, the HMT module 170 (e.g., the picture quality enhance module 1320) may acquire information about the rotation of the HMT 700 from the at least one sensor. For example, the information about the rotation may include a rotation direction or a rotation speed, etc. The HMT module 170 may adjust a time inserting a black image within a unit frame, on the basis of the acquired information about the rotation and, resultantly, may improve the aforementioned motion blur. For example, as the HMT 700 rotates fast, the HMT module 170 may relatively large adjust the time inserting the black image within the unit frame. This operation may be associated with the reference table of FIG. 20.

Figure 23:
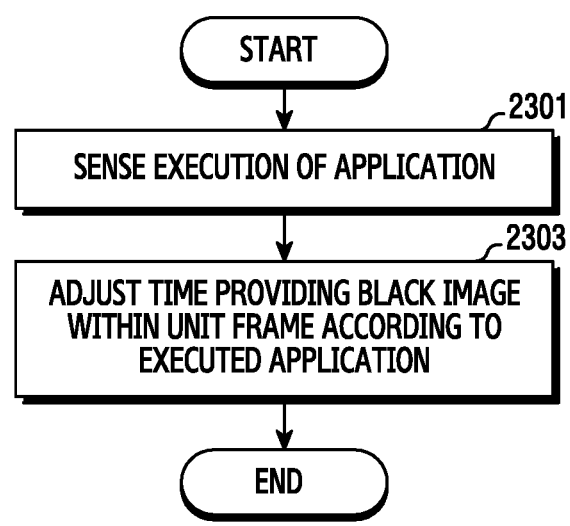
FIG. 23 illustrates a flow of inserting a black image in a unit frame in an HMT mode according to various example embodiments of the present disclosure.

FIG. 23 illustrates a flow of inserting a black image in a unit frame in an HMT mode according to various example embodiments of the present disclosure. And, FIG. 24 is an example diagram for explaining the flow of FIG. 23.

Referring to FIG. 23, in operation 2301, the HMT module 170 (e.g., the picture quality enhance module 1320) may sense the execution of an application (e.g., a video playback application).

In operation 2303, the HMT module 170 (e.g., the picture quality enhance module 1320) may adjust a time duration providing a black image within a unit frame, in accordance with the executed application. For example, referring to FIG. 24, the HMT module 170 may variously set a black image provision time within the unit frame on a per-application basis.

According to various example embodiments, the HMT module 170 may implement a reference table of FIG. 24 in accordance with the type of the application. For example, the HMT module 170 may differently adjust a black image provision time within a unit frame for an application for video playback and an application (e.g., an e-book) for text playback. Or, the HMT module 170 may determine the applying or non-applying of the black image within the unit frame in accordance with the type of the application. For example, the HMT module 170 may apply the black image within the unit frame to the application for video playback, while not applying the black image within the unit frame to the application for text playback.

According to various example embodiments, the reference table of FIG. 24 may be implemented by the HMT module 170 at a time when an application is installed in the electronic device 101.

According to various example embodiments, information about the black image provision time within the unit frame may be provided to the HMT module 170 as well at a time when the application is installed in the electronic device 101.

According to various example embodiments, the information about the black image provision time within the unit frame by application may be provided from an external device as well.

According to various example embodiments, the adjustment of the black image provision time within the unit frame by application may be implemented by user environment setting as well. For example, the HMT module 170 may provide an application list through a screen, and determine the black image provision time within the unit frame on a per-application basis by a user's input. Or, the HMT module 170 may provide the application list through the screen, and determine the selection of an application, which will apply the black image within the unit frame, by a user's input. Or, the HMT module 170 may notify an application, which will provide the black image within the unit frame, on the basis of a use history of the application, or may determine the applying or non-applying of the black image within the unit frame of the application by the user's input. For example, if the number and/or time of executing any one application is large compared to another application while the black image within the unit frame is not applied, the HMT module 170 may recommend the applying of the black image within the unit frame to the application, to a user.

Figure 25:
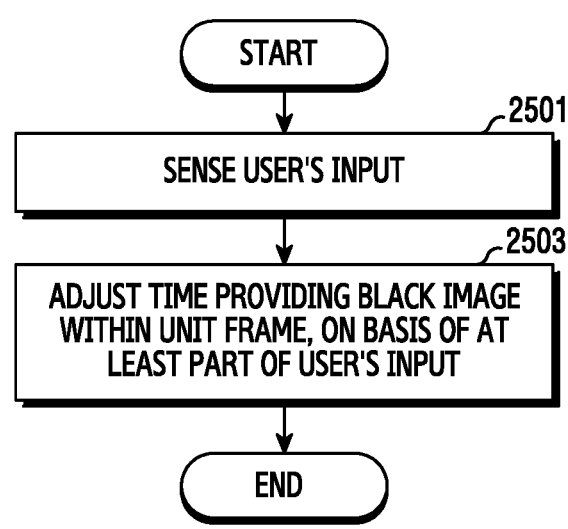
FIG. 25 illustrates a flow of inserting a black image in a unit frame in an HMT mode according to one example embodiment of the present disclosure.

FIG. 25 illustrates a flow of inserting a black image in a unit frame in an HMT mode according to one example embodiment of the present disclosure.

Referring to FIG. 25, in operation 2501, the HMT module 170 (e.g., the picture quality enhance module 1320) may sense a user's input.

In operation 2503, the HMT module 170 may adjust a time providing a black image within a unit frame, on the basis of at least a part of the user's input.

According to one example embodiment, in an HMT 700 state or a state in which the electronic device 101 and the HMD 1200 is separated from each other, the HMT module 170 may determine the time providing the black image within the unit frame, by the user's input through at least one user interface of the electronic device 101 or HMD 1200. For example, the electronic device 101 may provide a menu through a screen, and adjust the time displaying the black image within the unit frame, by a user's selective input.

Figure 26:
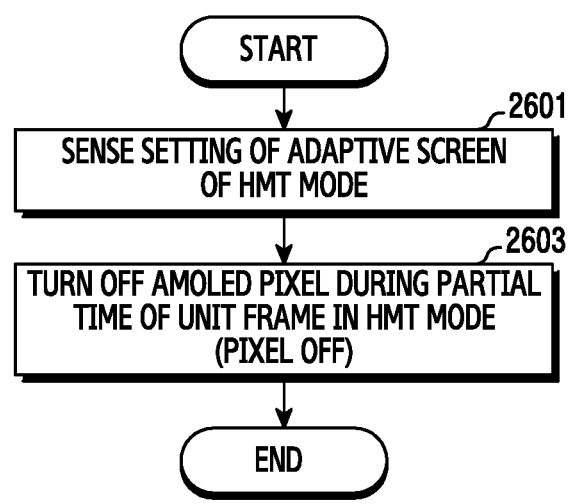
FIG. 26 illustrates an operation flow for improving motion blur of an HMT module in an Active-Matrix Organic Light-Emitting Diode (AMOLED) screen according to one example embodiment of the present disclosure.

FIG. 26 illustrates an operation flow for improving a motion blur of an HMT module in an AMOLED screen according to one example embodiment of the present disclosure.

Referring to FIG. 26, in operation 2601, the HMT module 170 (e.g., the sensing module 1310) may sense setting of an adaptive screen of an HMT mode (e.g., a stereoscopic mode or a case that the HMD 1200 is worn on the electronic device 101). For example, the HMT module 170 may sense the setting of the adaptive screen of the HMT mode, if it is the stereoscopic mode (i.e., a mode in which a similar or same image is separated and displayed for both eyes). For another example, if the HMD 1200 is worn on the electronic device 101, the HMT module 170 may recognize the setting of the adaptive screen of the HMT mode. For further example, the HMT module 170 may sense the setting of the adaptive screen of the HMT mode according to a user's manual input. For yet another example, the HMT module 170 may sense the setting of the adaptive screen of the HMT mode by user's selective input in a menu provided in a state in which the HMD 1200 is mounted on the electronic device 101. For still another example, the HMT module 170 may sense the setting of the adaptive screen of the HMT mode, if there is a wired or wireless functional connection between the electronic device 101 and the HMD 1200.

In operation 2603, the HMT module 170 (e.g., the picture quality enhance module 1320) may turn off (or deactivate or disable) an AMOLED pixel during a partial time of a unit frame in the HMT mode. If the AMOLED pixel turns off, an AMOLED screen may naturally or inherently express a dark color (e.g., a black color). This may result in the same effect as inserting a black image into a unit frame mentioned earlier in FIG. 16. According to one example embodiment, the HMT module 170 may turn off the AMOLED pixel at a predefined time rate within the unit frame.

According to one example embodiment, a display device using an AMOLED panel may activate the AMOLED light-emitting element during a certain time within the unit frame, and inactivate the AMOLED light-emitting element during the remaining time. This driving scheme may be called "AMOLED Impulsive Drive (AID)". The percentage of activating the AMOLED light-emitting element within the unit frame may be called "AID percentage".

Figure 27:
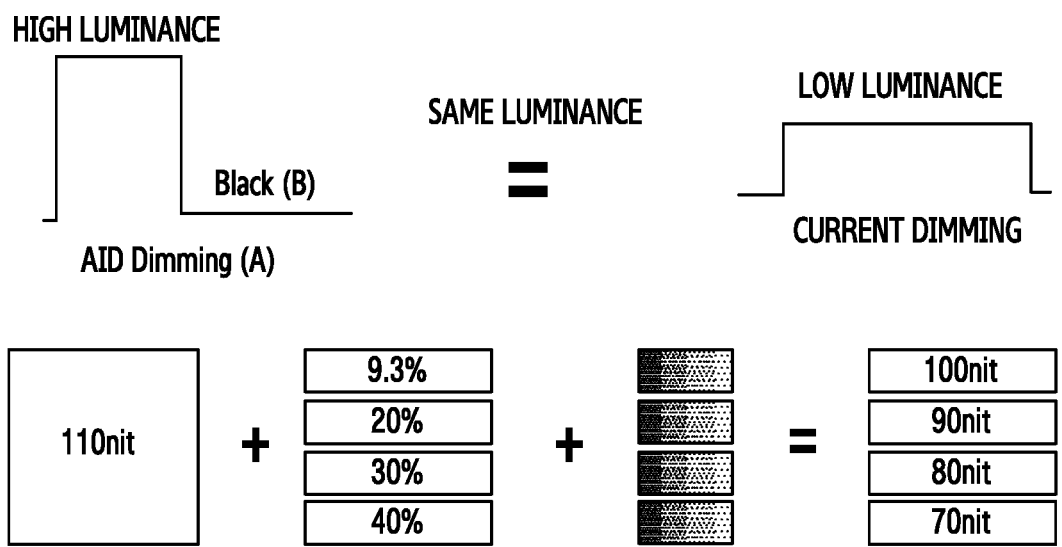
FIG. 27 is a schematic diagram illustrating screen brightness dependent on setting of an AMOLED Impulsive Drive (AID) percentage according to various example embodiments of the present disclosure.

FIG. 27 is a schematic diagram illustrating screen brightness dependent on setting of an AID percentage according to various example embodiments of the present disclosure.

Referring to FIG. 27, a phenomenon may occur in which the more the AID percentage is high, the more a screen is bright. Accordingly, if there is a change of the AID percentage, there is a need to adjust a light-emitting intensity of the AMOLED light-emitting element in order to express the same brightness.

As the AID percentage is set low, the motion blur may be improved. But, if the AID percentage is set too low, flicker may occur in which a black image is recognized by user's eyes. For example, an AID percentage optimal to the user's eyes may be prepared through a test.

Figure 28:
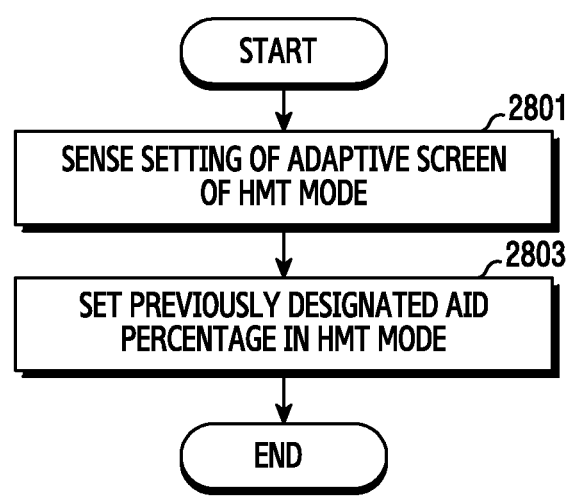
FIG. 28 illustrates a flow of setting an AID percentage in an HMT mode according to various example embodiments of the present disclosure.

FIG. 28 illustrates a flow of setting an AID percentage in an HMT mode according to various example embodiments of the present disclosure.

Referring to FIG. 28, in operation 2801, the HMT module 170 (e.g., the sensing module 1310) may sense setting of an adaptive screen of an HMT mode (e.g., a stereoscopic mode or a case that the HMD 1200 is worn on the electronic device 101).

In operation 2803, the HMT module 170 (e.g., the picture quality enhance module 1320) may set a previously designated AID percentage in the HMT mode. According to one example embodiment, the AID percentage may be designated as an optimized percentage (or a predefined percentage) in the HMT mode (e.g., a mode in which the electronic device 101 is connected to the HMD 1200) through a test.

Figure 29:
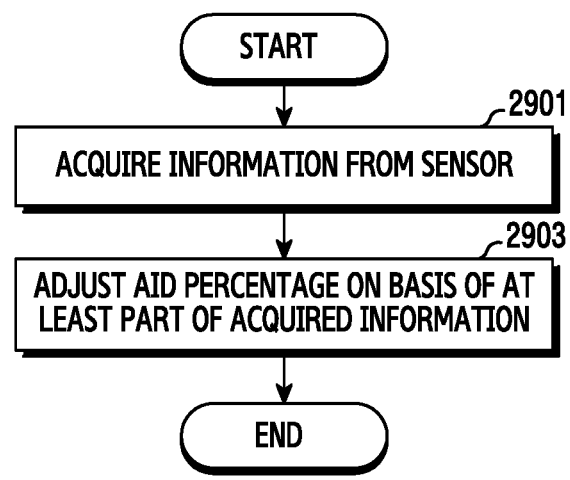
FIG. 29 illustrates a flow of setting an AID percentage in an HMT mode according to various example embodiments of the present disclosure.

FIG. 29 illustrates a flow of setting an AID percentage in an HMT mode according to various example embodiments of the present disclosure. And, FIG. 30 and FIG. 31 are reference tables for explaining the flow of FIG. 29.

Referring to FIG. 29, in operation 2901, the HMT module 170 (e.g., the picture quality enhance module 1320) may acquire information from a sensor. For example, the electronic device 101 and/or HMD 1200 may include a gesture sensor, a gyro sensor, an air pressure sensor, a magnetic sensor, an acceleration sensor, a grip sensor, a proximity sensor, an RGB sensor, a bio sensor, a temperature/humidity sensor, an illumination sensor, or a UV sensor, etc. The HMT module 170 may collect information from the aforementioned at least one or more sensors of the electronic device 101 and/or HMD 1200.

In operation 2903, the HMT module 170 may adjust an AID percentage on the basis of at least a part of the information acquired from the at least one or more sensors.

Referring to FIG. 30 according to one example embodiment, the HMT module 170 may check condition information from the information acquired from the at least one or more sensors. The HMT module 170 may set an AID percentage on the basis of the checked condition information. The condition information may be various according to the type of the sensor (e.g., the condition information '1', '2', '3' or '4', etc.). The condition information may be various according to a combination of a plurality of sensor (e.g., the condition information '1 and 2', '1 and 3', etc.). For example, the HMT module 170 may adjust the AID percentage, on the basis of the condition information '1' dependent on information about rotation measured from the acceleration sensor and the condition information '2' dependent on information measured from the RGB sensor.

Referring to FIG. 31 according to another example embodiment, the HMT module 170 may also adjust the AID percentage according to a size of a value (X) acquired from a sensor (below, referred to as a 'sensor value'). That is, as seen in FIG. 31, certain threshold values may be provided for the sensor value, such that when the sensor value detects a sensed condition within the threshold range, a corresponding AID percentage may be set. Any number of threshold ranges utilizing any particular threshold boundaries between the ranges may be set for each condition detectable by the sensors in order to configure AID percentages.

According to various example embodiments, a reference table of FIG. 30 or FIG. 31 may be implemented in consideration of common user's eye recognition. According to cases, the reference table may be adjusted on a per-user basis.

According to various example embodiments, the reference table of FIG. 30 or FIG. 31 may be mounted in a memory of the electronic device 101. Or, the reference table of FIG. 30 or FIG. 31 may be provided from an external device to the electronic device 101 as well.

Figure 32:
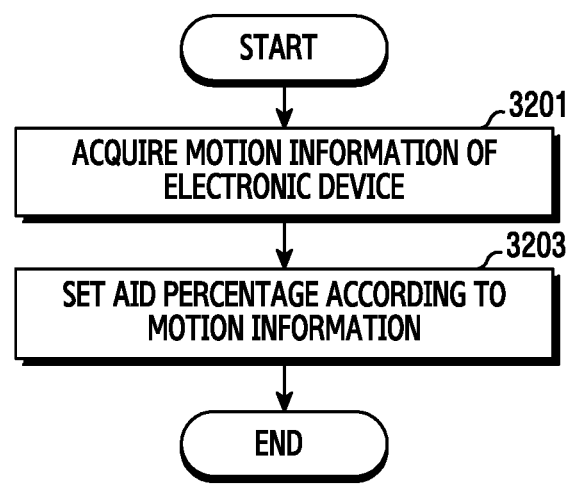
FIG. 32 illustrates a flow of setting an AID percentage in an HMT mode according to various example embodiments of the present disclosure.

FIG. 32 illustrates a flow of setting an AID percentage in an HMT mode according to various example embodiments of the present disclosure. And, FIG. 33 is a diagram for explaining the flow of FIG. 32.

Referring to FIG. 32, in operation 3201, the HMT module 170 (e.g., the picture quality enhance module 1320) may acquire motion information of the electronic device 101. For example, the HMT module 170 may obtain information about a motion of the electronic device 101 from a sensor module (e.g., an acceleration sensor, a gyro sensor or a gravity sensor, etc.) of the electronic device 101 or HMD 1200.

In operation 3203, the HMT module 170 (e.g., the picture quality enhance module 1320) may set an AID percentage according to the acquired motion information of the electronic device 101. For example, a user's head motion may be determined from the motion information of the electronic device 101. If the user's head motion (e.g., panning angle, tilting angle, speed of movement, or any other indicator related to head motion) is equal to or is less than a predefined threshold value, the HMT module 170 may increase the AID percentage to reduce the flicker mentioned in FIG. 27. Or, if the head motion is equal to or is greater than the predefined reference value, the HMT module 170 may decrease the AID percentage to improve the motion blur.

Figure 33:
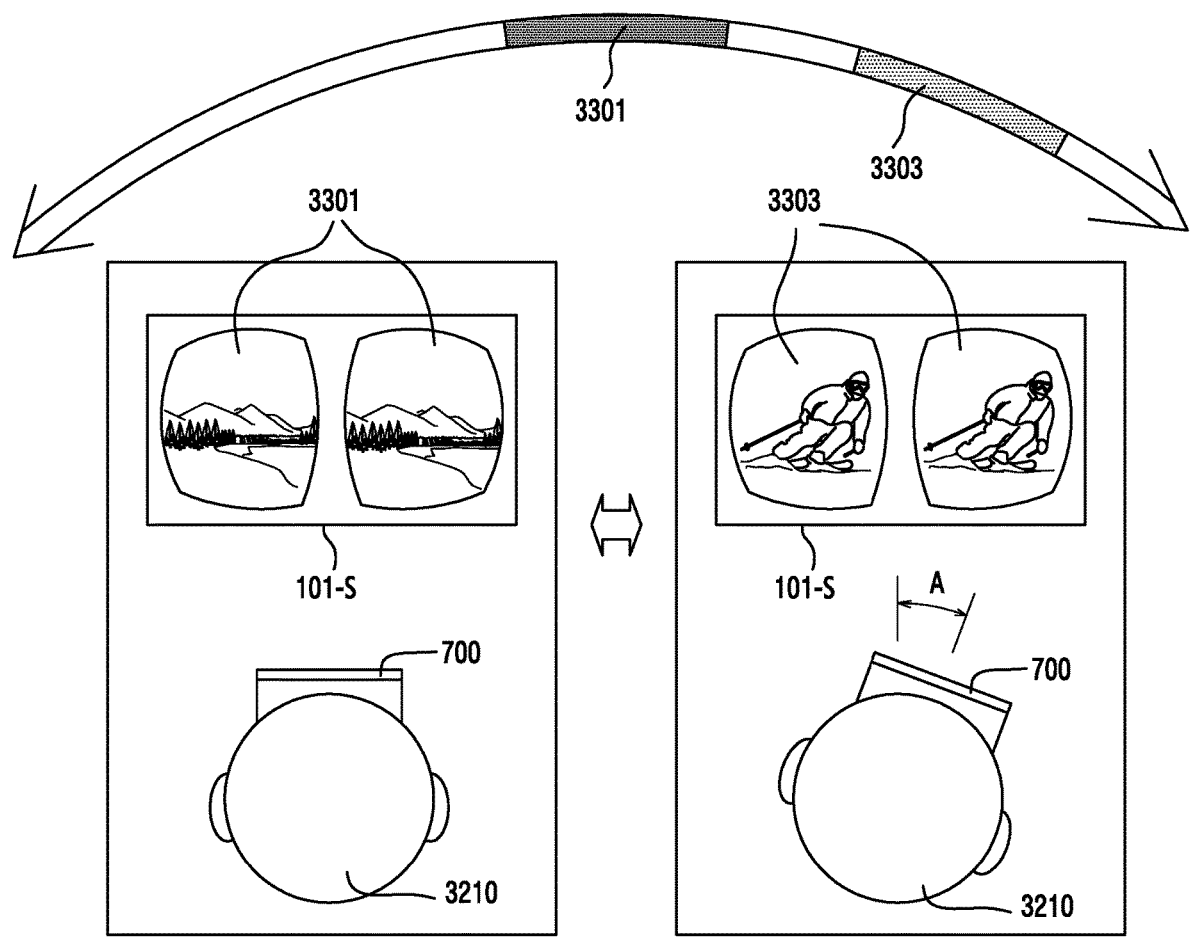
FIG. 33 is a diagram for explaining the flow of FIG. 32.

According to one example embodiment, referring to FIG. 33, in a state in which the HMT 700 is mounted on a user's head 3210, if the user's head 3210 is rotated, the HMT 700 may be also rotated by the user's head 3210. In response to the rotation, the HMT 700 may change an image provided through a screen (for example, a screen 101-S of the electronic device 101) from a first image 3301 to a second image 3303. At least one sensor mounted on the electronic device 101 of the HMT 700 and/or the HMD 1200 thereof may measure a rotation angle of the HMT 700. The HMT 700 may provide an image corresponding to the rotation angle measured from the at least one sensor. For example, the image provided through the screen 101-S of the HMT 700 may be an image stored in a memory of the electronic device 101. Or, the image provided through the screen 101-S of the HMT 700 may be an image captured through a camera mounted in the electronic device 101 and/or HMD 1200. For example, if the image of the screen 101-S is changed from the first image 3301 to the second image 3303 according to the rotation of the HMT 700, the aforementioned motion blur may be induced.

According to one example embodiment, the HMT module 170 (e.g., the picture quality enhance module 1320) may acquire information about the rotation of the HMT 700 from the at least one sensor. For example, the information about the rotation may include a rotation direction or a rotation speed, etc. The HMT module 170 may adjust an AID percentage on the basis of the acquired information about the rotation and, resultantly, may improve the aforementioned motion blur. For example, as the HMT 700 rotates fast, the HMT module 170 may relatively low adjust the AID percentage. This operation may be associated with the reference table of FIG. 31.

Figure 34:
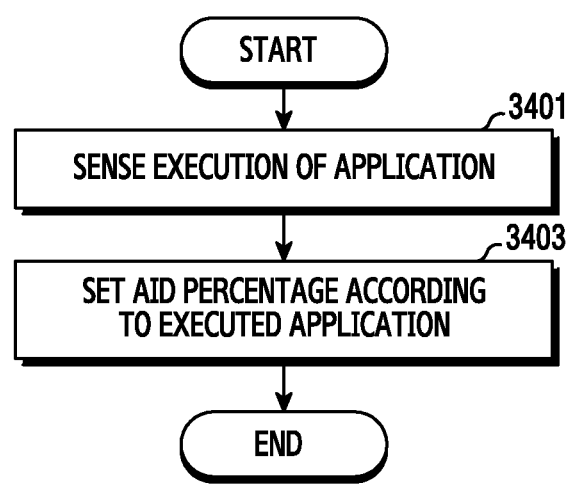
FIG. 34 illustrates a flow of setting an AID percentage in an HMT mode according to various example embodiments of the present disclosure.

FIG. 34 illustrates a flow of setting an AID percentage in an HMT mode according to various example embodiments of the present disclosure. And, FIG. 35 is a reference table for explaining the flow of FIG. 34.

Referring to FIG. 34, in operation 3401, the HMT module 170 (e.g., the picture quality enhance module 1320) may sense the execution of an application (e.g., a video playback application).

In operation 3403, the HMT module 170 (e.g., the picture quality enhance module 1320) may adjust an AID percentage in accordance with the executed application. For example, referring to FIG. 35, the HMT module 170 may variously set the AID percentage on a per-application basis.

According to various example embodiments, the HMT module 170 may implement a reference table in accordance with the type of the application. For example, the HMT module 170 may differently adjust AID percentages of an application for video playback and an application (e.g., an e-book) for text playback. Or, the HMT module 170 may determine the applying or non-applying of the AID percentage according to the type of the application. For example, the HMT module 170 may apply the AID percentage to the application for video playback, while not applying the AID percentage to the application for text playback.

According to various example embodiments, the reference table of FIG. 35 may be implemented by the HMT module 170 at a time when an application is installed in the electronic device 101.

According to various example embodiments, information about the AID percentage may be provided to the HMT module 170 as well at a time when the application is installed in the electronic device 101.

According to various example embodiments, the information about the AID percentage by application may be provided from an external device as well.

According to various example embodiments, the adjustment of the AID percentage by application may be implemented by user environment setting as well. For example, the HMT module 170 may provide an application list through a screen, and determine the AID percentage on a per-application basis by a user's input. Or, the HMT module 170 may provide the application list through the screen, and determine the selection of an application, which will apply the AID percentage, by the user's input. Or, the HMT module 170 may notify an application, which will provide the AID percentage, on the basis of a use history of the application, or may determine the applying or non-applying of the AID percentage of the application by the user's input. For example, if the number and/or time of executing any one application is large compared to another application while the AID percentage is not applied, the HMT module 170 may recommend the applying of the AID percentage to the application, to a user.

Figure 36:
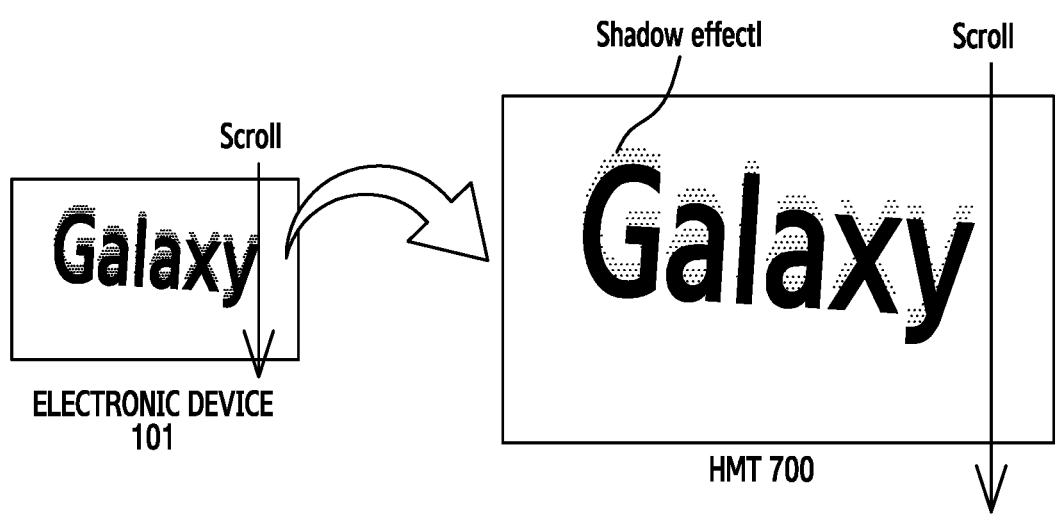
FIG. 36 is a diagram for explaining a shadow effect.

FIG. 36 is a diagram for explaining a shadow effect.

Referring to FIG. 36, the shadow effect refers to a phenomenon in which, for example, when an AMOLED pixel fast converts from a black color to a white color, an image is dragged like a shadow because a charging speed of a charging element included in the AMOLED pixel does not follow an electric field value applied to the AMOLED pixel within a time within a unit frame. For example, if a luminance fails to reach a target luminance within one unit frame, a user may recognize the shadow effect.

The HMT 700 has to move a position of an image displayed on a screen according to head tracking, and has to convert a color that the same pixel will have to express. Here, if there is a big difference (e.g., "0"→"255") between gray levels of a color of the original frame and a color of a next frame, because of the aforementioned reason, a charging amount of a corresponding pixel fails to reach 100%, and the HMT 700 expresses a color of a level not reaching this, e.g., a color of a gray level. As a result, the color of the gray level may be acknowledged or otherwise visually distinct as a shadow effect. When the user sees directly the screen of the electronic device 101 (e.g., a smart phone), he/she may subtly recognize the generated shadow or not. On the contrary, the user may relatively easily recognize the generated shadow when using the HMT 700 since the screen of the electronic device 101 may be seen through a lens of the HMD 1200.

Figure 37:
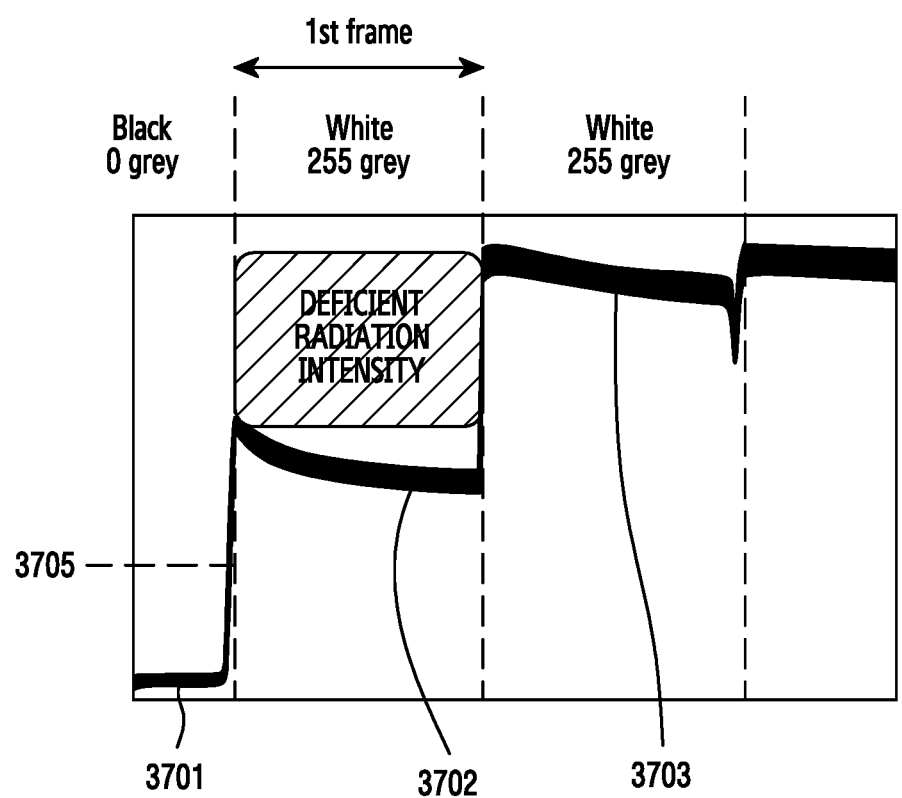
FIG. 37 is a diagram for explaining the occurrence of a shadow effect.

FIG. 37 is a diagram for explaining the occurrence of a shadow effect.

Referring to FIG. 37, for a pixel to reach a target color value (or a radiation intensity value), a charging time typically elapses, according to a characteristics (e.g., physical qualities) of a pixel constituent element. But, if there is a failure to achieve the desired charging due to insufficient charging time within a unit frame, an unwanted color or radiation intensity (e.g., a middle gray color or shadow) is displayed on a screen. This may cause the occurrence of the shadow effect. For example, an OLED panel circuit (e.g., an AMOLED panel circuit) for displaying a color in a pixel may have performance difficulties in providing a voltage value which will have to be charged to the AMOLED light-emitting element in order to change the pixel from a black color 3701 (e.g., RGB (0, 0, 0)) to a white color 3703 (e.g., RGB (255, 255, 255)), or difficult to provide a current flow flowing in the AMOLED light-emitting element within a unit frame (e.g., 1/60 seconds). Accordingly, because it is a state in which a relatively small voltage value is provided to the unit frame, a color (e.g., a gray color) not reaching the white color is displayed. Therefore, the user may recognize the shadow effect.

To improve this shadow effect, one example embodiment may implement display of a pixel expected to exhibit the black color 3701, in a color 3705 (e.g., a gray color) brighter than the black color 3701, thereby decreasing a voltage value which is provided to the AMOLED light-emitting element in order to change the black color 3701 of the pixel into the white color 3703. As a result, changing the pixel from the gray color 3705 to the white color 3703 may be relatively faster than changing the pixel from the black color 3701 to the white color 3703.

Figure 38:
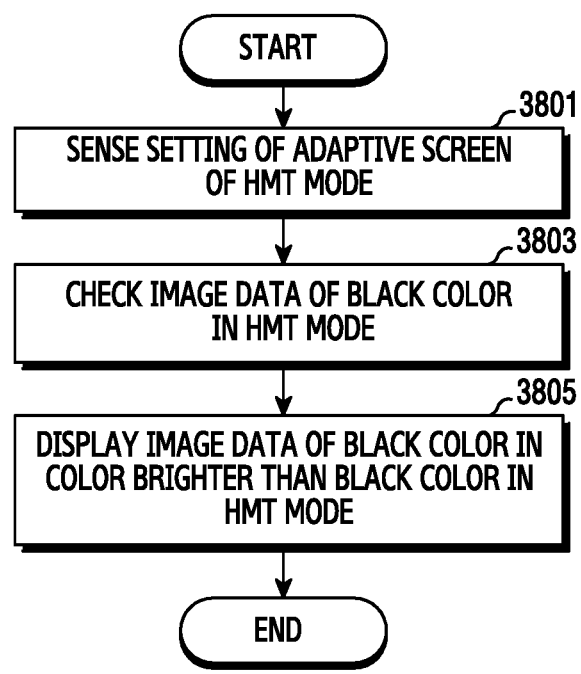
FIG. 38 illustrates an operation flow for improving a shadow effect of an OLED screen (e.g., an AMOLED screen) in an HMT mode according to one example embodiment of the present disclosure.

FIG. 38 illustrates an operation flow for improving a shadow effect of an OLED screen (e.g., AMOLED screen) in an HMT mode according to one example embodiment of the present disclosure.

Referring to FIG. 38, in operation 3801, the HMT module 170 (e.g., the sensing module 1310) may sense setting of an adaptive screen of the HMT mode (e.g., a stereoscopic mode or a case that the HMD 1200 is worn on the electronic device 101).

In operation 3803, the HMT module 170 (e.g., the picture quality enhance module 1320) may check image data of a black color in the HMT mode.

In operation 3805, the HMT module 170 may display the image data of the black color, in a color (e.g., RGB (6, 6, 6) or RGB (8, 8, 8)) brighter than the black color (e.g., RGB (0, 0, 0)). Here, an AMOLED panel circuit may apply a relatively high voltage value to the AMOLED light-emitting element, to implement a pixel of the color brighter than the black color. Or, the AMOLED panel circuit may also apply a relatively more current flow to the AMOLED light-emitting element, to implement the pixel of the color brighter than the black color.

For example, although the pixel changes into the color brighter than the black color, it is desirable to hide this effect from a user fail, so as to prevent them from recognizing or otherwise being cognizant of the effect. Selecting the color replacing the black color may thus be of importance. According to one example embodiment, to improve the shadow effect, the pixel expected to be displayed in the black color cannot be unconditionally changed into the color brighter than the black color. The reason is that, because a viewing environment itself is dark in the HMT 700, the color brighter than the black color may not be recognized as the black color by the user. For example, in a case of movie contents having to express a dark environment, it may be inappropriate to display a specific pixel in the color brighter than the black color, not in the original black color.

Figure 39:
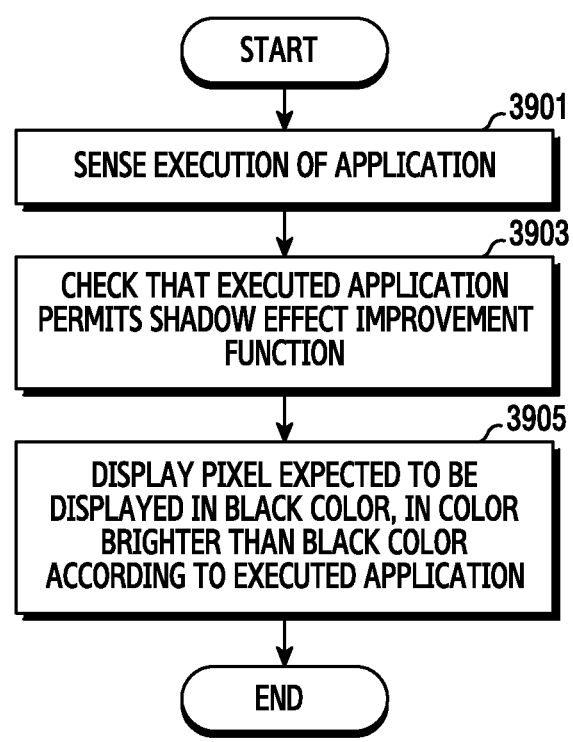
FIG. 39 illustrates an operation flow for improving a shadow effect of an AMOLED screen in an HMT mode according to various example embodiments of the present disclosure.

FIG. 39 illustrates an operation flow for improving a shadow effect of an AMOLED screen in an HMT mode according to various example embodiments of the present disclosure.

Referring to FIG. 39, in operation 3901, the HMT module 170 (e.g., the picture quality enhance module 1320) may sense the execution of an application.

In operation 3903, the HMT module 170 (e.g., the picture quality enhance module 1320) may check that the executed application permits a shadow effect improvement function.

In operation 3905, the HMT module 170 (e.g., the picture quality enhance module 1320) may display a pixel expected to be displayed in a black color, in a color brighter than the black color in accordance with the executed application.

For example, the HMT module 170 may selectively apply the aforementioned shadow effect improvement function to an application mainly suffering from the shadow effect, or adjust the color replacing the black color as well. As above, selectively applying the shadow effect improvement function on a per-application basis may be made by a user selection/configuration or an operation of the electronic device 101 itself. For example, the electronic device 101 may selectively apply the aforementioned shadow effect improvement function to an application displaying a large quantity of white color, such as a browser or an e-book, etc.

Figure 40:
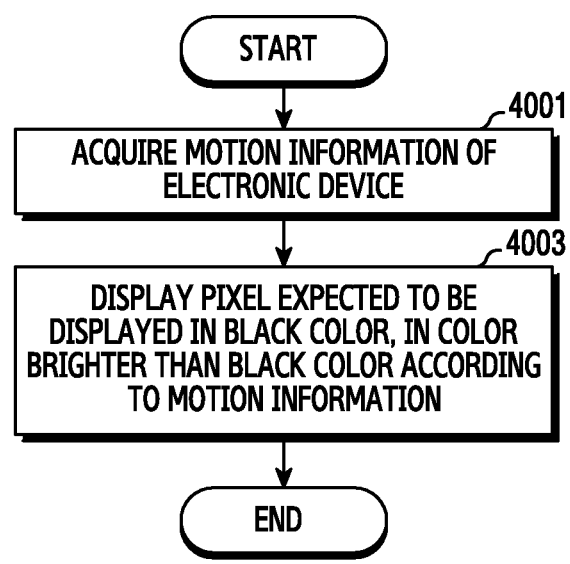
FIG. 40 illustrates an operation flow for improving a shadow effect of an AMOLED screen in an HMT mode according to various example embodiments of the present disclosure.

FIG. 40 illustrates an operation flow for improving a shadow effect of an AMOLED screen in an HMT mode according to various example embodiments of the present disclosure.

Referring to FIG. 40, in operation 4001, the HMT module 170 (e.g., the picture quality enhance module 1320) may obtain information about a motion of the electronic device 101.

In operation 4003, in accordance with the motion information, the HMT module 170 (e.g., the picture quality enhance module 1320) may display a pixel expected to be displayed in a black color, in a color brighter than the black color. For example, the HMT module 170 (e.g., the picture quality enhance module 1320) may adjust the color (i.e., RGB value) replacing the black color according to a user's head motion. For example, <Table 1> below is an example of designating a color replacing a black color according to a user's head motion type, which in this example, indicates a particular speed of the user's head motion.

TABLE 1

| User head motion | RGB value |
| --- | --- |
| Fast | RGB(8, 8, 8) |
| Normal | RGB(6, 6, 6) |
| Slow | RGB(0, 0, 0) |

Referring to Table 1, in case that a user's head motion occurs fast, a black color may change into a color of an RGB (8, 8, 8) value. Or, in case that the user's head motion is not so much, the black color may change into a color of an RGB (6, 6, 6) value. Or, in case that the user's head motion does not almost occur, the black color having an RGB (0, 0, 0) value may be maintained. It is noted that "fast," "normal" and "slow" may be defined in terms of threshold ranges of velocity or acceleration, with threshold velocities or accelerations indicating the boundary between each threshold range of "fast," "normal" and "slow" It is also understood that further thresholds or motion types may be utilized to set the threshold ranges, such as a degree of motion (e.g., threshold angles of panning or tilting).

Figure 41:
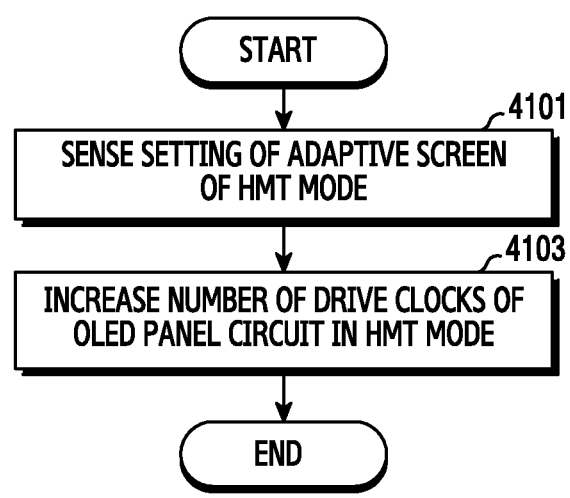
FIG. 41 illustrates an operation flow for improving a shadow effect of an OLED screen in an HMT mode according to various example embodiments of the present disclosure.

FIG. 41 illustrates an operation flow for improving a shadow effect of an OLED screen in an HMT mode according to various example embodiments of the present disclosure.

Referring to FIG. 41, in operation 4101, the HMT module 170 (e.g., the picture quality enhance module 1320) may sense setting of an adaptive screen of the HMT mode (e.g., a stereoscopic mode or a case that the HMD 1200 is worn on the electronic device 101).

In operation 4103, the HMT module 170 (e.g., the picture quality enhance module 1320) may increase the number of drive clocks of an OLED panel circuit in the HMT mode. For example, an OLED panel may include the OLED panel circuit for implementing a color of a pixel. The OLED panel circuit may include an OLED light-emitting element, and the OLED light-emitting element may form a pixel. Or, a circuit may be added to increase the efficiency of a charging element included in a circuit constituting the OLED pixel.

According to one example embodiment, the electronic device 101 may further include a Motion Clearance (MC) circuit. If the number of clocks of the MC circuit increases, a charging speed of a pixel may be increased by the MC circuit. Or, a voltage for light-emitting the OLED light-emitting element as desired may be provided faster, and the OLED light-emitting element may perform desired light-emitting faster. The MC circuit may be controlled by a Display Driver IC (DDI) of a display module.

Figure 42:
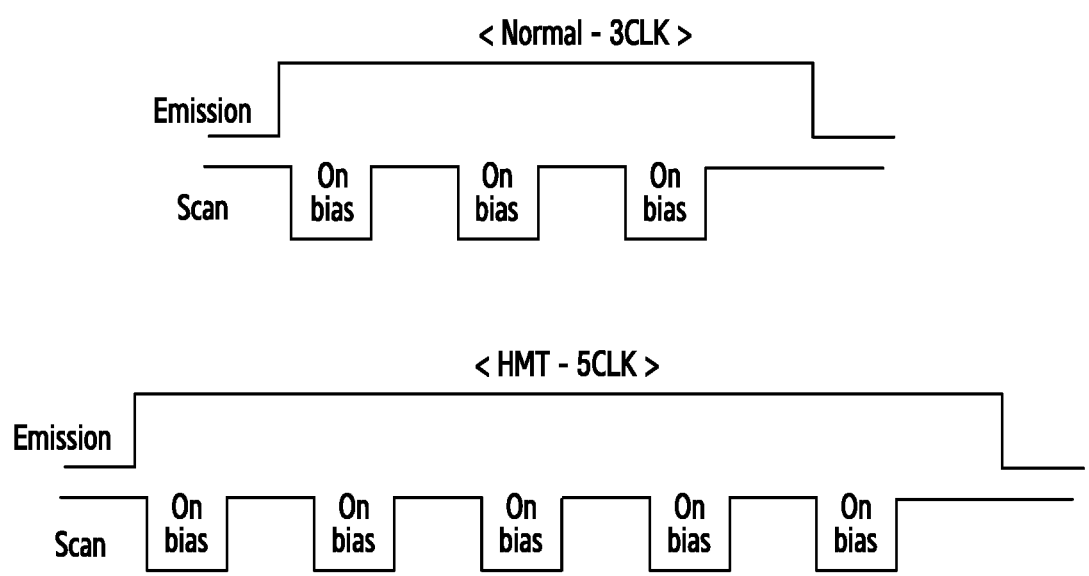
FIG. 42 illustrates the number of clocks of a Motion Clearance (MC) circuit for expressing a unit frame.

FIG. 42 illustrates the number of clocks of an MC circuit for expressing a unit frame (for example, a horizontal synchronization). For example, in case that an adaptive screen of an HMT mode is not executed (i.e., execution of a normal mode), the MC circuit may be driven by three clocks (CLK) (as shown in a top drawing of FIG. 42). In contrast, in case that the adaptive screen of the HMT mode is being executed (i.e., it is in the HMT mode), the MC circuit may be driven by five CLKs to improve the shadow effect (as shown in a bottom drawing of FIG. 42).

According to one example embodiment, if the number of clocks of the MC circuit increases, a current consumption may increase. To improve the increase of the current consumption, the number of clocks of the MC circuit may be also adjusted according to the type of an application or a motion of a user.

Figure 43:
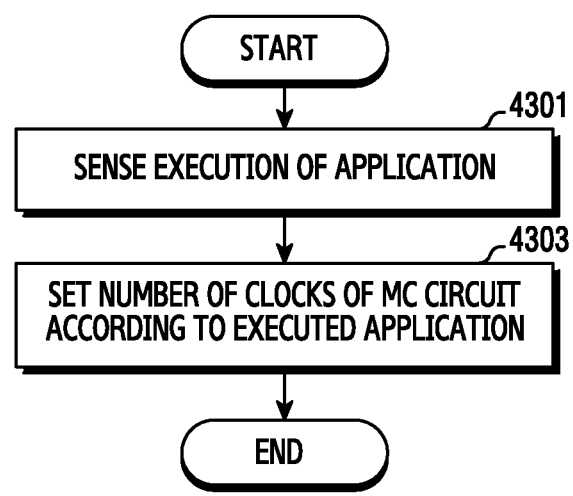
FIG. 43 illustrates an operation flow for improving a shadow effect of an OLED screen in an HMT mode according to various example embodiments of the present disclosure.

FIG. 43 illustrates an operation flow for improving a shadow effect of an OLED screen in an HMT mode according to various example embodiments of the present disclosure.

Referring to FIG. 43, in operation 4301, the HMT module 170 (e.g., the picture quality enhance module 1320) may sense the execution of an application.

In operation 4303, the HMT module 170 (e.g., the picture quality enhance module 1320) may set the number of clocks of an MC circuit in accordance with the executed application.

According to one example embodiment, the HMT module 170 may variously adjust the number of clocks of the MC circuit by application. The HMT module 170 may implement a reference table designating the number of clocks of the MC circuit by application in accordance with the type of the application. For example, the HMT module 170 may differently adjust the number of clocks of the MC circuit for an application for video playback and an application (e.g., e-book) for text playback.

According to various example embodiments, the reference table about the number of clocks of the MC circuit by application may be implemented by the HMT module 170 at a time when the application is installed in the electronic device 101.

According to various example embodiments, information about the number of clocks of the MC circuit may be provided to the HMT module 170 as well at a time when the application is installed in the electronic device 101.

According to various example embodiments, the information about the number of clocks of the MC circuit by application may be provided from an external device as well.

According to various example embodiments, the adjustment of the number of clocks of the MC circuit by application may be also implemented by a user environment setting. For example, the HMT module 170 may provide an application list through a screen, and determine the number of clocks of the MC circuit by application by a user's input.

Figure 44:
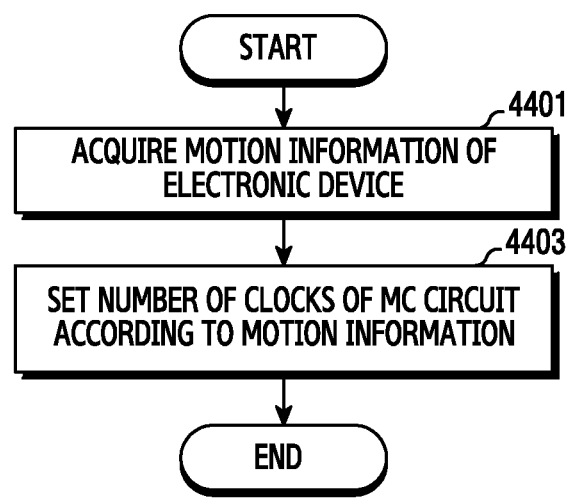
FIG. 44 illustrates an operation flow for improving a shadow effect of an OLED screen in an HMT mode according to various example embodiments of the present disclosure.

FIG. 44 illustrates an operation flow for improving a shadow effect of an OLED screen in an HMT mode according to various example embodiments of the present disclosure.

Referring to FIG. 44, in operation 4401, the HMT module 170 (e.g., the picture quality enhance module 1320) may obtain information about a motion of the electronic device 101. For example, the electronic device 101 and/or HMD 1200 may include at least one sensor. The HMT module 170 may acquire the information about the motion of the electronic device 101 from the at least one sensor of the electronic device 101 and/or HMD 1200.

In operation 4403, the HMT module 170 (e.g., the picture quality enhance module 1320) may set the number of clocks of an MC circuit in accordance with the motion information.

Figure 45:
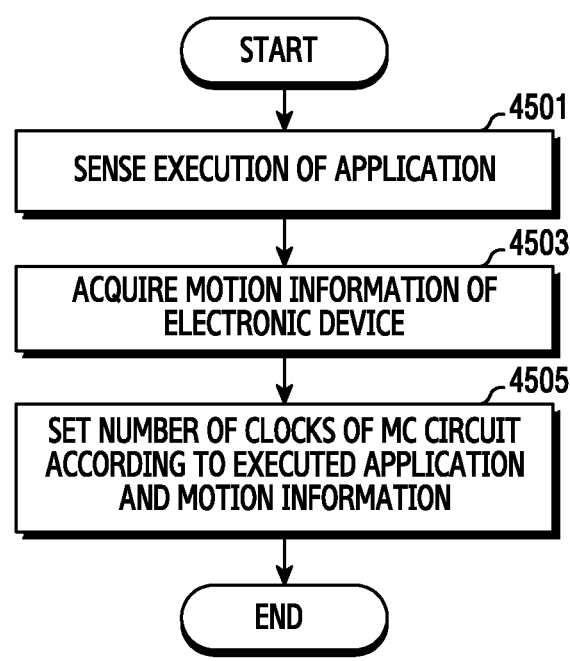
FIG. 45 illustrates an operation flow for improving a shadow effect of an OLED screen in an HMT mode according to various example embodiments of the present disclosure.

FIG. 45 illustrates an operation flow for improving a shadow effect of an OLED screen in an HMT mode according to various example embodiments of the present disclosure.

Referring to FIG. 45, in operation 4501, the HMT module 170 (e.g., the picture quality enhance module 1320) may sense the execution of an application.

In operation 4503, the HMT module 170 may acquire motion information of the electronic device 101.

In operation 4505, the HMT module 170 may set the number of clocks of the MC circuit in accordance with the executed application and the motion information.

In one example embodiment, <Table 2> below suggests the number of clocks of the MC circuit dependent on the kind of an application or a head motion of a user.

TABLE 2

| Application | User's head motion | Number of clocks of MC circuit |
| --- | --- | --- |
| Browser (e.g., high shadow effect) | Fast (e.g., top threshold velocity range) | 7 CLK |
| Picture Gallery (e.g., normal shadow effect) | Normal (e.g., standard threshold velocity range) | 5 CLK |
| Virtual Reality (e.g., low shadow effect) | Slow (e.g., lowest threshold velocity range) | 3 CLK |

Referring to Table 2, when the application, such as a browser, has a higher shadow effect, or when the user's head motion is in a higher/faster velocity range, the number of clocks of the MC circuit may be set high, such as 7 CLK.

In the HMT mode, a user may suffer "dazzling." The dazzling effect may refer to a phenomenon in which, when the user looks at a bright screen in a dark environment such as a dark room, he/she is dazzled and his/her eyesight fatigue increases. According to one example embodiment, in the HMT mode, the AID percentage is adjusted as above, so it may automatically darken a brightness of the AID percentage compared to a pre-existing brightness, thereby reducing the effect of dazzling. There may be a difference between a color a user actually experiences and a color intended to be expressed according to the AID adjustment. According to one example embodiment, a much darker color may be set collectively as well. Besides, other various picture quality improvement algorithms may be applied additionally.

In case that a user watches a screen of the electronic device 101 arranged before his/her eyes in the HMT mode, he/she may feel visual fatigue.

Figure 46:
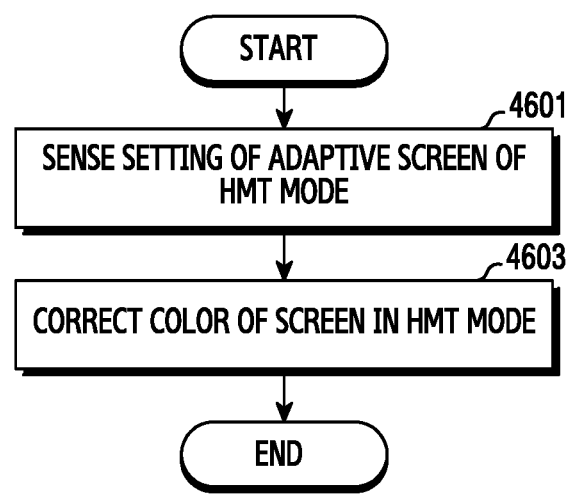
FIG. 46 illustrates an operation flow for improving a visual fatigue in an HMT mode according to various example embodiments of the present disclosure.
Figure 47:
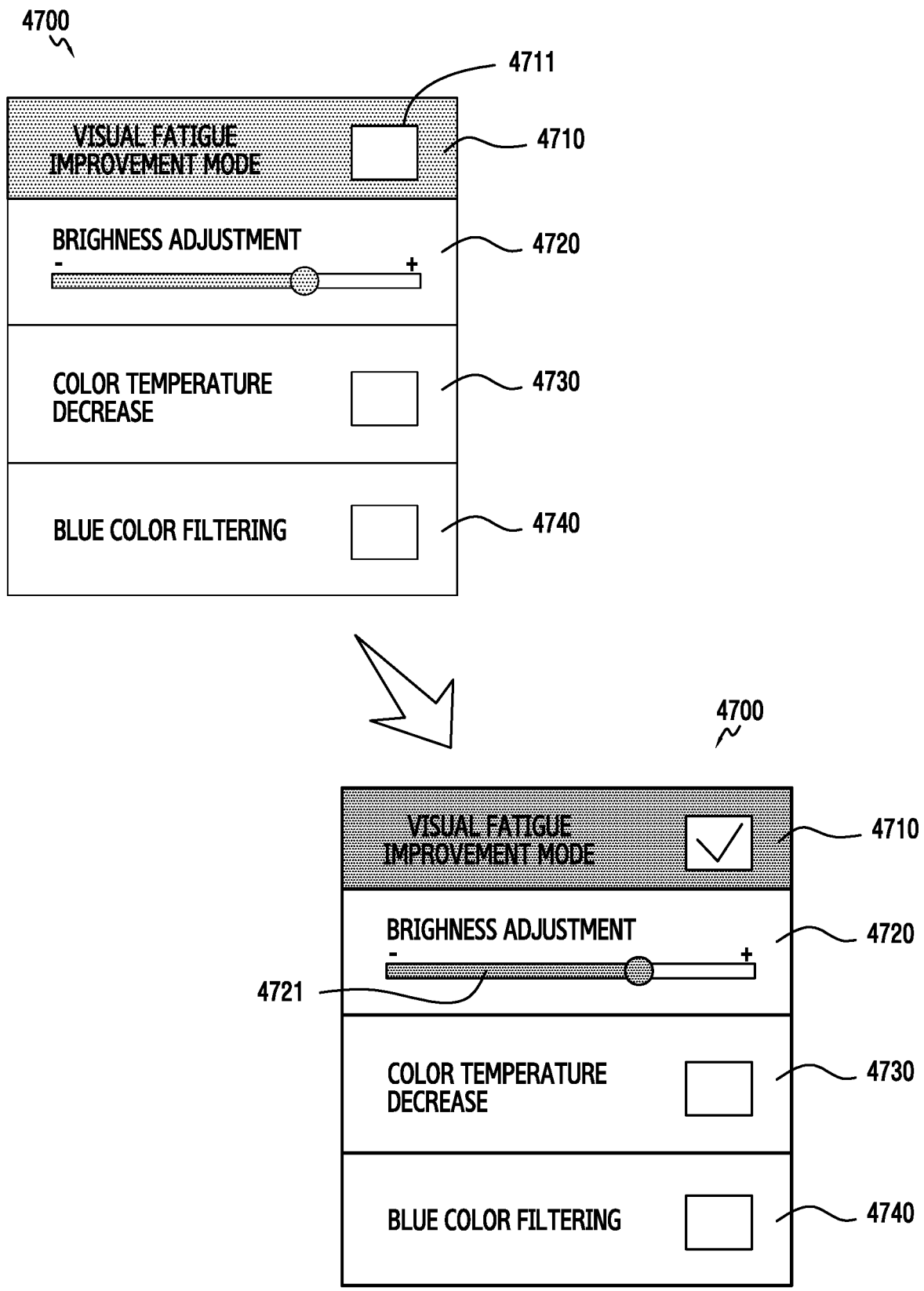
FIG. 47 illustrates a menu of a visual fatigue improvement mode provided through a screen in an HMT mode according to one example embodiment of the present disclosure.

FIG. 46 illustrates an operation flow for improving a visual fatigue in an HMT mode according to various example embodiments of the present disclosure. And, FIG. 47 illustrates a menu of a visual fatigue improvement mode provided through a screen in an HMT mode according to one example embodiment of the present disclosure.

Referring to FIG. 46, in operation 4601, the HMT module 170 (e.g., the picture quality enhance module 1320) may sense setting of an adaptive screen of the HMT mode (e.g., a stereoscopic mode or a case that the HMD 1200 is worn on the electronic device 101).

In operation 4603, the HMT module 170 (e.g., the picture quality enhance module 1320) may correct a color of the screen in the HMT mode.

In one example embodiment, a visual fatigue may be improved through the adjustment of a color temperature of the screen. For example, to make better a visual picture quality in a normal mode, the visual fatigue may be set to express a white (bluish) color close to a blue color. The bluish white color may have a high color temperature compared to a white color close to a red color. A phenomenon may take place in which, when images with a high color temperature are exposed to a user's eyes for a long period of time, the user's visual fatigue increases. Therefore, the normal mode may set the bluish white color (e.g., about 7500 Kelvin), and the HMT mode may set the low color temperature (e.g., about 6500 K).

In another example embodiment, visual fatigue may be reduced by refraining from displaying one or more colors of a harmful specific wavelength (e.g., about 450 nanometer or "nm").

In a further example embodiment, the visual fatigue may be improved even in a manner of adjusting a brightness of a screen.

In addition, there may be various screen color correction for improving the visual fatigue (for example, applying various kinds of effect filters (e.g., blue color filtering)).

According to various example embodiments, the aforementioned screen color correction for improvement of the visual fatigue may be set by a user or be set in an automatic fashion. For example, a menu for the screen color correction may be provided and, through the menu, the user may manually set the screen color correction. Or, the screen color correction may be set on the basis of the type of an application or a head motion of the user.

Referring to FIG. 47 according to one example embodiment, a menu 4700 may provide a visual fatigue improvement mode item 4710, a brightness adjustment item 4720, a color temperature decrease item 4730 or a blue color filtering item 4740.

For example, in case that a user uses an input means (e.g., a hardware button, a finger touch, or a stylus, etc.) to select the visual fatigue improvement mode item 4710, the electronic device 101 may enter a visual fatigue improvement mode, and provide an indicator for notifying the entering of the visual fatigue improvement mode (i.e., clicking a check box).

If entering the visual fatigue improvement mode, the electronic device 101 converts indicators of the brightness adjustment item 4720, the color temperature decrease item 4730, and the blue color filtering item 4740 from disable states to able states. According to one example embodiment, if the user moves an adjustment bar of the brightness adjustment item 4720, the electronic device 101 may adjust a brightness of a screen. Or, if the user selects the color temperature decrease item 4730 (e.g., clicking the empty check box, which would subsequently display a check marking), the electronic device 101 may decrease a color temperature of the screen to a previously designated color temperature. Or, if the user selects the blue color filtering item 4740, the electronic device 101 may display a white color of the screen close to a blue color.

According to various example embodiments, the electronic device 101 concurrently supporting a first picture quality mode (e.g., a normal smartphone environment) and a second picture quality mode (e.g., an HMT operation environment) may determine if the electronic device 101 is mounted on the HMD 1200 (e.g., USB connection), and automatically convert the normal picture quality mode into the HMT picture quality mode (for example, the adaptive screen of the HMT mode described with reference to FIG. 15 to FIG. 47).

According to another example embodiment, the electronic device 101 may also determine if the user wears the HMT 700 mounting the electronic device 101, and convert a picture quality mode. A method of determining wearing or non-wearing may use a proximity sensor, a capacitive sensor, a pressure sensitivity sensor, etc. mounted in a frame. According to one example embodiment, the user may manually convert the picture quality mode into the HMT picture quality mode as well.

According to a further example embodiment, when converted into a stereoscopic mode, the electronic device 101 may convert the picture quality mode as well. For example, though not illustrated, the electronic device 101 may be an integral HMT including the HMD 1200, or may convert the picture quality mode according to conversion into the stereoscopic mode.

According to one example embodiment of the present disclosure, a display method of a display device may include sensing setting of an adaptive screen of an HMT mode, by the display device, and expressing a black color during a partial time of a unit image frame in the HMT mode, by the display device.

According to one example embodiment of the present disclosure, the HMT mode may include a mode of interworking with an HMD or a mode in which the same image is displayed left and right.

According to one example embodiment of the present disclosure, the setting of the adaptive screen of the HMT mode may be based on a stereoscopic mode.

According to one example embodiment of the present disclosure, the setting of the adaptive screen of the HMT mode may be based on the wearing or non-wearing of an HMD.

According to one example embodiment of the present disclosure, the setting of the adaptive screen of the HMT mode may be based on a user's manual input.

According to one example embodiment of the present disclosure, the setting of the adaptive screen of the HMT mode may be based on a wired or wireless functional connection between the display device and an HMD.

According to one example embodiment of the present disclosure, the setting of the adaptive screen of the HMT mode by the display device may include at least one of sensing conversion into the HMT mode, sensing interworking with an HMD, sensing a request of a picture quality enhancement function from a user in the HMT mode, and sensing user's wearing of the HMD.

According to one example embodiment of the present disclosure, the display method may further include adjusting a time duration expressing the black color, in accordance with at least one of a user's input, an executed application, and motion information of the display device.

According to one example embodiment of the present disclosure, the expressing of the black color may be implemented in a scheme of inserting a black image at the partial time of the unit image frame.

According to one example embodiment of the present disclosure, the expressing of the black color may be implemented in a scheme of disabling the screen during the partial time of the unit image frame.

According to one example embodiment of the present disclosure, expressing the black color during the partial time of the unit image frame in the HMT mode may use an AID scheme.

According to another example embodiment of the present disclosure, a display method of a display device including an OLED screen may include sensing setting of an adaptive screen of an HMT mode, by the display device, and increasing the number of drive clocks of an OLED panel circuit in the HMT mode, by the display device.

According to another example embodiment of the present disclosure, the HMT mode may include a mode of interworking with an HMD or a mode in which the same image is displayed left and right.

According to another example embodiment of the present disclosure, the setting of the adaptive screen of the HMT mode may be based on a stereoscopic mode.

According to another example embodiment of the present disclosure, the setting of the adaptive screen of the HMT mode may be based on the wearing or non-wearing of an HMD.

According to another example embodiment of the present disclosure, the setting of the adaptive screen of the HMT mode may be based on a user's manual input.

According to another example embodiment of the present disclosure, the setting of the adaptive screen of the HMT mode may be based on a wired or wireless functional connection between the display device and an HMD.

According to another example embodiment of the present disclosure, the display method may further include setting the number of drive clocks of the OLED panel circuit based on at least one of a user's input, an executed application, and motion information of the display device.

According to a further example embodiment of the present disclosure, a display method of a display device may include sensing setting of an adaptive screen of an HMT mode, by the display device, and checking image data of a black color in the HMT mode, by the display device, and displaying the image data of the black color in a color brighter than the black color in the HMT mode, by the display device.

According to a further example embodiment of the present disclosure, the HMT mode may include a mode of interworking with an HMD or a mode in which the same image is displayed left and right.

According to a further example embodiment of the present disclosure, the setting of the adaptive screen of the HMT mode may be based on a stereoscopic mode.

According to a further example embodiment of the present disclosure, the setting of the adaptive screen of the HMT mode may be based on the wearing or non-wearing of an HMD.

According to a further example embodiment of the present disclosure, the setting of the adaptive screen of the HMT mode may be based on a user's manual input.

According to a further example embodiment of the present disclosure, the setting of the adaptive screen of the HMT mode may be based on a wired or wireless functional connection between the display device and an HMD.

According to a further example embodiment of the present disclosure, the display method may include determining a color replacing a black color based on at least one of a user's input, an executed application, and motion information of the display device.

According to a further example embodiment of the present disclosure, the color brighter than the black color may include a gray color.

According to various example embodiments of the present disclosure, a display method of a display device may include sensing setting of an adaptive screen of an HMT mode, by the display device, and correcting a color of the screen in the HMT mode, by the display device.

According to various example embodiments of the present disclosure, the HMT mode may include a mode of interworking with an HMD or a mode in which the same image is displayed left and right.

According to various example embodiments of the present disclosure, the setting of the adaptive screen of the HMT mode may be based on a stereoscopic mode.

According to various example embodiments of the present disclosure, the setting of the adaptive screen of the HMT mode may be based on the wearing or non-wearing of an HMD.

According to various example embodiments of the present disclosure, the setting of the adaptive screen of the HMT mode may be based on a user's manual input.

According to various example embodiments of the present disclosure, the setting of the adaptive screen of the HMT mode may be based on a wired or wireless functional connection between the display device and an HMD.

According to various example embodiments of the present disclosure, correcting the color of the screen may display the color of the screen at a previously designated color temperature.

According to various example embodiments of the present disclosure, correcting the color of the screen may not display a color of a specific wavelength.

According to various example embodiments of the present disclosure, correcting the color of the screen may set a brightness of the color of the screen to a lower brightness than before entering the HMT mode.

In case that an electronic device is mounted on an HMD, the electronic device may provide an enhanced picture quality to a user and improve a screen visibility and a visual fatigue.

According to various example embodiments of the present disclosure, a display method for a display device comprises activating a Head Mounted Theater (HMT) mode, the HMT mode displaying two images which are substantially same each other on first and second areas respectively, separated from each other, in a display area of the display device, and adjusting a display time, for displaying a black screen in the first and second areas, of a unit frame time when the HMT mode is activated.

According to various example embodiments of the present disclosure, the black screen is provided by disabling the first and second areas.

According to various example embodiments of the present disclosure, the display device includes an Active-Matrix Organic Light-Emitting Diode (AMOLED), and the adjusting the display time for displaying the black screen is provided by adjusting a percentage of inactivating the AMOLED.

According to various example embodiments of the present disclosure, the black screen is provided by displaying a black image.

According to various example embodiments of the present disclosure, the HMT mode is activated when the display device is communicatively coupled to a Head-Mounted Device (HMD).

According to various example embodiments of the present disclosure, the HMT mode is activated when detecting that the display device is worn by a user.

According to various example embodiments of the present disclosure, the HMT mode is activated in response to detection of a user input.

According to various example embodiments of the present disclosure, the display method further comprises detecting a movement of the display device, and adjusting a period of the black screen based on the detected movement.

According to various example embodiments of the present disclosure, the display method further comprises detecting an execution of an application in associated with the image, and adjusting a period of the black screen based on the application.

According to various example embodiments of the present disclosure, a display method for a display device including an Organic Light Emitting Diode (OLED) comprises activating a Head Mounted Theater (HMT) mode, the HMT mode display an image on first and second area, separated from each other, in a display area of the display device; and increasing a driving clock speed of an Organic Light Emitting Diode (OLED) circuit for driving the OLED in the HMT mode.

According to various example embodiments of the present disclosure, the HMT mode is activated when the display device is communicatively coupled to a Head-Mounted Device (HMD).

According to various example embodiments of the present disclosure, the HMT mode is activated when detecting that the display device is worn by a user.

According to various example embodiments of the present disclosure, the HMT mode is activated in response to detection of a user input.

According to various example embodiments of the present disclosure, the display method further comprises detecting a movement of the display device, and adjusting the driving clock speed of the OLED panel circuit based on the detected movement.

According to various example embodiments of the present disclosure, the display method further comprises detecting an execution of an application in associated with the image, and adjusting the driving clock speed of the OLED panel circuit based on the application.

And, example embodiments of the present disclosure disclosed in the present specification and drawings merely suggest specific examples so as to easily explain the technological content of the present disclosure and help the understanding of the present disclosure, and do not intend to limit the example embodiments of the present disclosure. Accordingly, it should be understood that the example embodiments of the present disclosure includes all modified or changed forms drawn on the basis of the example embodiments of the present disclosure besides the example embodiments disclosed herein.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA.

As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer.

No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

What is claimed is:

1. An electronic device mountable on a wearable device, the electronic device comprising:
    a memory configured to store instructions;
    a display; and
    at least one processor that is, when executing the instructions, configured to:
        provide, via the display, image frames with at least one black screen for a first designated time period per unit frame;
        while providing a multimedia content with the at least one black screen for the first designated time period per unit frame, execute a virtual reality (VR) mode that displays the multimedia content as two images separated from each other such that the multimedia content is displayed as a stereoscopic image; and
        in response to executing the VR mode, provide, via the display, the multimedia content with the at least one black screen for a second designated time period different from the first designated time period per unit frame.

2. The electronic device of claim 1, wherein the at least one processor is, when executing the instructions, configured to:
    while providing each of the image frames as one image with the at least one black screen for the first designated time period per unit frame, receive an input for switching a normal mode to the VR mode; and
    in response to the reception of the input, execute the VR mode.

3. The electronic device of claim 2, wherein the input is caused by the electronic device being mounted on the wearable device.

4. The electronic device of claim 2, wherein the input is caused by the electronic device being connected to the wearable device wirelessly or via a wire.

5. The electronic device of claim 2, wherein the input is caused by a user input on a menu displayed via the display.

6. The electronic device of claim 2, wherein the input is caused by at least one application being executed in response to detecting that the electronic device is mounted on the wearable device.

7. The electronic device of claim 2, wherein the second designated time period is longer than the first designated time period.

8. The electronic device of claim 1, wherein the black screen is provided by ceasing to display the two images for the second designated time period per unit frame.

9. The electronic device of claim 1, wherein the display comprises an active-matrix organic light-emitting diode (AMOLED), and
    wherein the black screen is provided by inactivating the AMOLED for the second designated time period per unit frame.

10. The electronic device of claim 1, further comprising:
at least one sensor,
wherein the at least one processor is, when executing the instructions, further configured to:
while providing the multimedia content with the at least one black screen for the second designated time period, detect a movement of the electronic device via the at least one sensor; and
provide, via the display, the multimedia content with the at least one black screen for a third designated time period that is changed from the second designated time period per unit frame, based on detecting the movement of the electronic device,
wherein the third designated time period is longer than the first designated time period and the second designated time period.

11. A non-transitory computer-readable storage medium storing instructions executable by a processor of an electronic device mountable on a wearable device to cause the processor to perform a method, the method comprising:
providing, via a display of the electronic device, image frames with at least one black screen for a first designated time period per unit frame;
while providing a multimedia content with the at least one black screen for the first designated time period per unit frame, executing a virtual reality (VR) mode that displays the multimedia content as two images separated from each other such that the multimedia content is displayed as a stereoscopic image; and
in response to executing the VR mode, providing, via the display, the multimedia content with the at least one black screen for a second designated time period different from the first designated time period per unit frame.

12. The non-transitory computer-readable storage medium of claim 11, wherein the method further comprises:
while providing each of the image frames as one image with the at least one black screen for the first designated time period per unit frame, receiving an input for switching a normal mode to the VR mode; and
in response to the reception of the input, executing the VR mode.

13. The non-transitory computer-readable storage medium of claim 12, wherein the input is caused by the electronic device being mounted on the wearable device.

14. The non-transitory computer-readable storage medium of claim 12, wherein the input is caused by the electronic device being connected to the wearable device wirelessly or via a wire.

15. The non-transitory computer-readable storage medium of claim 12, wherein the input is caused by a user input on a menu displayed via the display.

16. The non-transitory computer-readable storage medium of claim 12, wherein the input is caused by at least one application being executed in response to detecting that the electronic device is mounted on the wearable device.

17. The non-transitory computer-readable storage medium of claim 12, wherein the second designated time is longer than the first designated time.

18. The non-transitory computer-readable storage medium of claim 11, wherein the black screen is provided by ceasing to display the two images for the second designated time per unit frame.

19. The non-transitory computer-readable storage medium of claim 11, wherein the method further comprises:
while providing the multimedia content with the at least one black screen for the second designated time, detecting a movement of the electronic device; and
providing, via the display, the multimedia content with the at least one black screen for a third designated time changed from the second designated time per unit frame, based on detecting the movement of the electronic device,
wherein the third designated time is longer than the first designated time and the second designated time.

20. A method executed in an electronic device mountable on a wearable device, the method comprising:
providing, via a display of the electronic device, image frames with at least one black screen for a first designated time period per unit frame;
while providing a multimedia content with the at least one black screen for the first designated time period per unit frame, executing a virtual reality (VR) mode that displays the multimedia content as two images separated from each other such that the multimedia content is displayed as a stereoscopic image; and
in response to executing the VR mode, providing, via the display, the multimedia content with the at least one black screen for a second designated time period different from the first designated time period per unit frame.

* * * * *